US011286340B2

United States Patent
Miyake et al.

(10) Patent No.: US 11,286,340 B2
(45) Date of Patent: Mar. 29, 2022

(54) GROUP TRANSFER POLYMERIZATION FOR THE PRODUCTION OF FUNCTIONAL MONOMERS

(71) Applicant: Colorado State University Research Foundation, Fort Collins, CO (US)

(72) Inventors: Garret Miyake, Fort Collins, CO (US); Ryan M. Pearson, Berkeley, CA (US); Matthew D. Ryan, Berkeley, CA (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 16/775,755

(22) Filed: Jan. 29, 2020

(65) Prior Publication Data

US 2020/0239626 A1     Jul. 30, 2020

Related U.S. Application Data

(60) Provisional application No. 62/798,289, filed on Jan. 29, 2019.

(51) Int. Cl.
    *C08G 61/12*     (2006.01)

(52) U.S. Cl.
    CPC ......... *C08G 61/125* (2013.01); *C08G 61/124* (2013.01); *C08G 2261/128* (2013.01); *C08G 2261/136* (2013.01); *C08G 2261/1426* (2013.01); *C08G 2261/1432* (2013.01); *C08G 2261/3241* (2013.01); *C08G 2261/3245* (2013.01); *C08G 2261/3324* (2013.01); *C08G 2261/418* (2013.01)

(58) Field of Classification Search
    CPC ................ C08G 61/125; C08G 61/124; C08G 2261/3241; C08G 2261/3245; C08G 2261/3323; C08G 2261/418
    See application file for complete search history.

(56) References Cited

U.S. PATENT DOCUMENTS

| 2,411,516 A | 11/1946 | Bruson |
| 2013/0296491 A1 | 11/2013 | Xia et al. |
| 2014/0011958 A1 | 1/2014 | Miyake et al. |

(Continued)

OTHER PUBLICATIONS

International Search Report and Written Opinion, PCT/US2020/015608, dated Apr. 23, 2020.

(Continued)

*Primary Examiner* — Ling Siu Choi
*Assistant Examiner* — David L Miller
(74) *Attorney, Agent, or Firm* — Polsinelli PC

(57) ABSTRACT

The present invention provides efficient processes for preparing brush polymers. In general, the process comprises three distinct reaction steps utilizing two separate catalysts. In the first step, the initiating compound comprising norbornene is contacted with a silane in the presence of a catalyst, thereby forming a silated intermediate. This silated intermediate is then contacted with a monomer in the presence of a catalyst via Group Transfer Polymerization (GTP). The resulting compound from GTP is contacted with a ring opening metathesis polymerization (ROMP) catalyst to prepare the brush polymer. Surprisingly, the brush polymers obtained from the above process are accessed in an efficient and rapid GTP methodology as compared to prior methods.

17 Claims, 3 Drawing Sheets

(56) References Cited

U.S. PATENT DOCUMENTS

2014/0213815 A1     7/2014   Choi et al.
2016/0251508 A1*   9/2016   Hustad .................... C08L 83/10
                                                                                  524/504

OTHER PUBLICATIONS

Gestwicki JE, Cairo CW, Strong LE, Oetjen KA, Kiessling LL. Influencing Receptor-Ligand Binding Mechanisms with Multivalent Ligand Architecture. Journal of American Chemical Society. 2002;124:14922-14933.

Hagiwara H, Katsumi T, Endou S, Hoshi T, Suzuki T. Domino ring opening-ring closing metathesis (ROM-RCM) strategy toward bicyclo[n.3.0]cycloalkenes. Tetrahedron. 2002;58:6651-6654.

Rogers RL, Moore, JL, Rovis T. Alkene-Directed Regioselective Nickel-Catalyzed Cross-Coupling of Cyclic Anhydrides with Diorganozinc Reagents. Angewandte Chemie International Edition. 2007;46:9301-9304.

Nomura K, Abdellatif MM. Precise synthesis of polymers containing functional end groups by living ring-opening metathesis polymerization (ROMP): Efficient tools for synthesis of block/graft copolymers. Polymer. 2010;51:1861-1881.

Meyers A, Week M. Design and Synthesis of Alq3-Functionalized Polymers. Macromolecules. 2003;36:1766-1768.

\* cited by examiner

GROUP TRANSFER POLYMERIZATION FOR THE PRODUCTION OF FUNCTIONAL MONOMERS

RELATED APPLICATIONS

This application claims the benefit of the filing date of U.S. Provisional Application No. 62/798,289, filed Jan. 29, 2019, the contents of which are herein incorporated by reference in its entirety.

GOVERNMENTAL RIGHTS

This invention was made with government support under DE-AR0000881 awarded by the Department of Energy. The government has certain rights in the inventions disclosed.

FIELD OF THE INVENTION

The present disclosure generally relates to an efficient method for producing brush polymers.

BACKGROUND OF THE INVENTION

Brush polymers (BPs) are polymers which feature polymeric side chains grafted to a linear backbone. BPs have found widespread use toward applications such as coatings, optical films, paints, cosmetic products, photonic crystals, multilayer polymer materials, nanostructured materials, membranes, apparel, coatings and materials for buildings, coatings and materials for transportation, coatings and materials for electronics, lithography, photovoltaics, sensors, anti-counterfeiting, rheological modifiers, lubricants. To access BPs structures, grafting-from, grafting-to, or grafting-through strategies have been used. The grafting-to method typically uses a monotelechelic polymer chain that can be later "clicked" on to a functionalized linear backbone. Similarly, the grafting-from method allows for the polymer to be grown directly from an initiating site off a linear backbone. Unfortunately, both of these methods offer poor control over back bone grafting density. Alternatively, the grafting through approach involves the polymerization of monomers and results in a controlled and quantitative grafting density.

Synthetic challenges still exist in the production of acrylic monomers with the necessary chemical functionality for use in ring opening metathesis polymerization (ROMP). Currently, acrylic based monomers are synthesized via atom transfer radical polymerization, reversible addition-fragmentation chain-transfer, nitroxide mediated polymerization, or living anionic polymerization. These methods typically involve an initial polymerization process followed by chain end group transformations to functionalize the polymer and thus enable further polymerization by ROMP. Each step towards this click reaction usually take numerous precipitations at low temperatures to isolate the monomer from impurities that can poison the ROMP step. An initiating from approach off groups which can undergo ROMP has been attempted using the first three mentioned controlled radical polymerization methods, however, these radical based polymerizations can result in colored monomers, unstable chain end-groups, and inherently lead to radical-radical termination events giving a ditelechilic monomer that is difficult to purify, and ultimately leads to undesirable crosslinking of the BP. Recently, there has been work toward terminating anionic polymerizations with a functional norbornene "terminator", however these methods require expensive terminators, low polymerization temperatures (<0° C.), multi-day reaction times and additives to avoid backbiting in the case of acrylic monomers.

There remains a need for an efficient process to prepare brush polymers with simplified purifications, high purity, and low manufacturing cost.

SUMMARY OF THE INVENTION

In one aspect of the disclosure, efficient processes to prepare brush polymers comprising the compound of Formula (V) are provided.

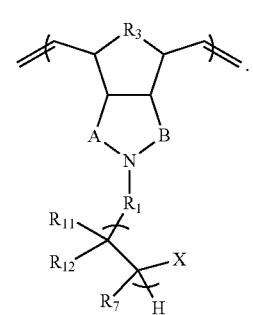

These Processes Generally Include:

(a) contacting a compound comprising Formula (I):

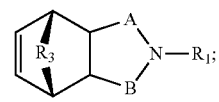

in the presence of a silane and a catalyst to form a compound comprising Formula (II):

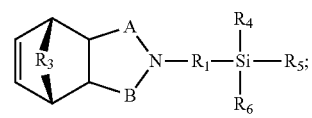

(b) contacting the compound comprising Formula (II) with a monomer comprising Formula (III), optionally in the presence of a catalyst:

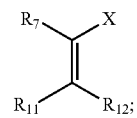

to prepare a compound comprising Formula (IV):

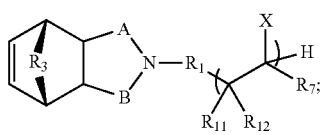

and (c) contacting the compound comprising Formula (IV) with a ring opening metathesis polymerization (ROMP) catalyst to prepare a compound Formula (V).

In some embodiments, A and B are independently selected from $CH_2$ or CO=O; $R_1$ is selected from substituted or unsubstituted $C_1$-$C_{10}$OH, substituted or unsubstituted arylOH, substituted or unsubstituted $C_1$-$C_{10}$$COR_7$, substituted or unsubstituted aryl$COR_7$, substituted or unsubstituted $C_1$-$C_{10}$OCOCH=$CH_2$, substituted or unsubstituted arylOCOCH=$CH_2$, substituted or unsubstituted $C_1$-$C_{10}$OCOC($CH_3$)=$CH_2$, substituted or unsubstituted arylOCOC($CH_3$)=$CH_2$, substituted or unsubstituted $C_1$-$C_{10}$NHCOCH=$CH_2$, or substituted or unsubstituted arylNHCOCH=$CH_2$; $R_3$ is $CHR_8$ or O; $R_4$, $R_5$, and $R_6$ are independently selected from a group consisting of H, $C_1$-$C_8$ substituted or unsubstituted alkyl, or substituted or unsubstituted aryl; $R_7$ is selected from a group consisting of hydrogen, or substituted or unsubstituted $C_1$-$C_{10}$ alkyl; X is CN, $COOR_8$, or $CONR_9R_{10}$; $R_8$, $R_9$, and $R_{10}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl and $R_{11}$ and $R_{12}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl.

In another aspect of the disclosure, efficient processes for preparing brush polymers comprising the compound of Formula (IXA) and/or (IXB) are provided.

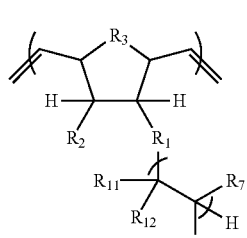

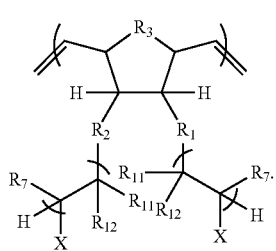

The Processes Generally Include:

(a) contacting a compound comprising Formula (VI):

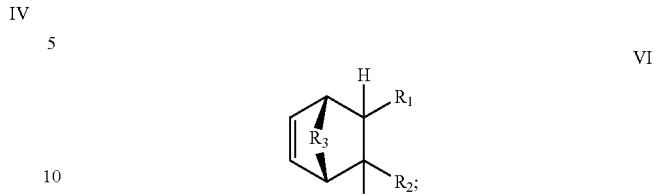

in the presence of a silane and a catalyst to form a compound comprising Formula (VIIA) and/or (VIIB):

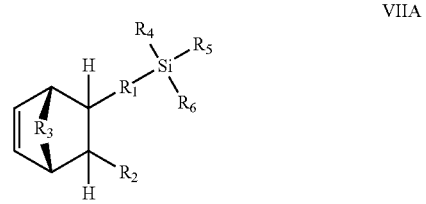

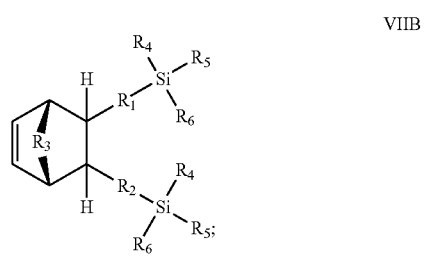

(b) contacting the compound comprising Formula (VIIA) and/or (VIIB) with a monomer comprising Formula (III) in the presence of a catalyst:

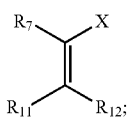

to prepare the compound comprising Formula (VIIIA) and/or (VIIIB):

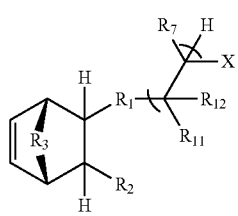

-continued

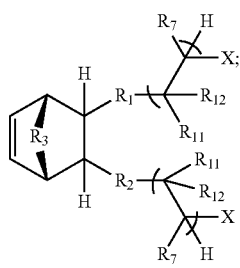

VIIIB and (c) contacting the compound comprising Formula (VIIIA) and/or (VIIIB) with a ring opening metathesis polymerization (ROMP) catalyst to prepare the compound comprising Formula (IXA) and/or (IXB).

In some embodiments, $R_1$ is selected from substituted or unsubstituted $C_1$-$C_{10}$OH, substituted or unsubstituted arylOH, substituted or unsubstituted $C_1$-$C_{10}$COR$_7$, substituted or unsubstituted arylCOR$_7$, substituted or unsubstituted $C_1$-$C_{10}$OCOCH=CH$_2$, substituted or unsubstituted arylOCOCH=CH$_2$, substituted or unsubstituted $C_1$-$C_{10}$OCOC(CH$_3$)=CH$_2$, substituted or unsubstituted arylOCOC(CH$_3$)=CH$_2$, substituted or unsubstituted $C_1$-$C_{10}$NHCOCH=CH$_2$, or substituted or unsubstituted arylNHCOCH=CH$_2$; $R_2$ is selected from a group consisting of hydrogen, substituted or unsubstituted $C_1$-$C_{10}$OH, substituted or unsubstituted arylOH, substituted or unsubstituted $C_1$-$C_{10}$OCOC(CH$_3$)=CH$_2$, or substituted or unsubstituted arylOCOC(CH$_3$)=CH$_2$; $R_3$ is CHR$_8$ or O; $R_4$, $R_5$, and $R_6$ are independently selected from a group consisting of H, $C_1$-$C_8$ substituted or unsubstituted alkyl, or substituted or unsubstituted aryl; $R_7$ is selected from a group consisting of hydrogen, substituted or unsubstituted $C_1$-$C_{10}$ alkyl; X is CN, COOR$_8$, or CONR$_9$R$_{10}$; $R_8$, $R_9$, and $R_{10}$ are independently selected from a group consisting of hydrogen, $C_1$-$C_{10}$ substituted or unsubstituted alkyl optionally substituted with at least one heteroatom on the alkyl chain, substituted or unsubstituted aryl, or substituted or unsubstituted heteroaryl; and $R_{11}$ and $R_{12}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl.

Yet another aspect of the disclosure relates to a composition comprising a compound having a Formula (VIIIA) and/or (VIIIB):

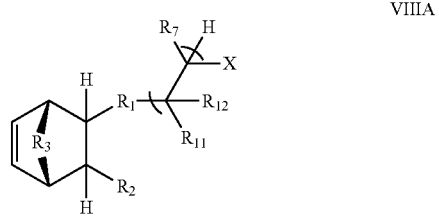

VIIIA

-continued

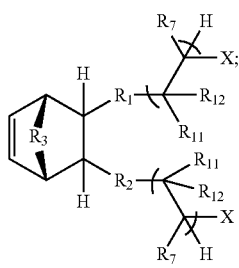

VIIIB wherein $R_1$ is selected from substituted or unsubstituted $C_1$-$C_{10}$OH, substituted or unsubstituted arylOH, substituted or unsubstituted $C_1$-$C_{10}$COR$_7$, substituted or unsubstituted arylCOR$_7$, substituted or unsubstituted $C_1$-$C_{10}$OCOCH=CH$_2$, substituted or unsubstituted arylOCOCH=CH$_2$, substituted or unsubstituted $C_1$-$C_{10}$OCOC(CH$_3$)=CH$_2$, substituted or unsubstituted arylOCOC(CH$_3$)=CH$_2$, substituted or unsubstituted $C_1$-$C_{10}$NHCOCH=CH$_2$, or substituted or unsubstituted arylNHCOCH=CH$_2$; $R_2$ is selected from a group consisting of hydrogen, substituted or unsubstituted $C_1$-$C_{10}$OH, substituted or unsubstituted arylOH, substituted or unsubstituted $C_1$-$C_{10}$OCOC(CH$_3$)=CH$_2$, or substituted or unsubstituted arylOCOC(CH$_3$)=CH$_2$; $R_3$ is CHR$_8$ or O; $R_7$ is selected from a group consisting of hydrogen, substituted or unsubstituted $C_1$-$C_{10}$ alkyl; $R_8$ is selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl; and $R_{11}$ and $R_{12}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl.

Other features and iterations of the invention are described in more detail below.

DETAILED DESCRIPTION OF THE INVENTION

In one aspect, the present disclosure provides processes for the preparation of brush polymers. In general, the process comprises three distinct reaction steps. In the first step, the initiating compound comprising norbornene is contacted with a silane in the presence of a catalyst, thereby forming a silated intermediate. This silated intermediate is then contacted with a monomer in the presence of a second catalyst via Group Transfer Polymerization (GTP). Surprisingly, the use of a second catalyst enables superior reactivity in the GTP process. The resulting compound from GTP is contacted with a ring opening metathesis polymerization (ROMP) catalyst to prepare the brush polymer.

In certain embodiments, the present disclosure provides for group transfer polymerization (GTP) that can be initiated from a functionalized norbornene at room temperature, taken to quantitative conversion in less than 2 hours, and used in ROMP after passing the resulting monomer through solid adsorbent media. Specifically, the functional norbornene initiator may be generated in a reaction vessel through an in-situ 1,4 hydrosilation of a norbornene methacrylate synthon. In the same reaction vessel, subsequent polymerization may proceed through addition of acrylic monomer(s). In accordance with aspects of the disclosure, GTP offers the opportunity to avoid stringent temperature restrictions, can be completed within 24 hours, and is scalable to multi-kilogram batches while controlling for un-desirable side reactions.

(I) Methods of the Disclosure, Preparation of Compounds of Formula (V)

One aspect of the present disclosure provides a process for preparing the compound of Formula (V):

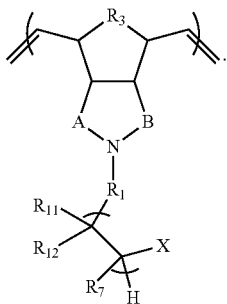

V

The process comprises contacting a compound comprising Formula (I):

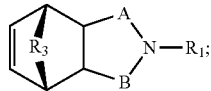

I in the presence of a silane and a catalyst to form a compound comprising Formula (II):

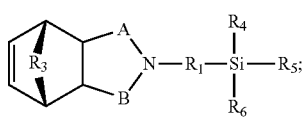

II contacting the compound comprising Formula (II) with a monomer comprising Formula (III), optionally in the presence of a catalyst:

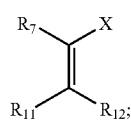

III to prepare a compound comprising Formula (IV):

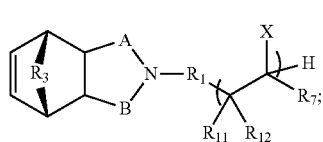

Figure 1:
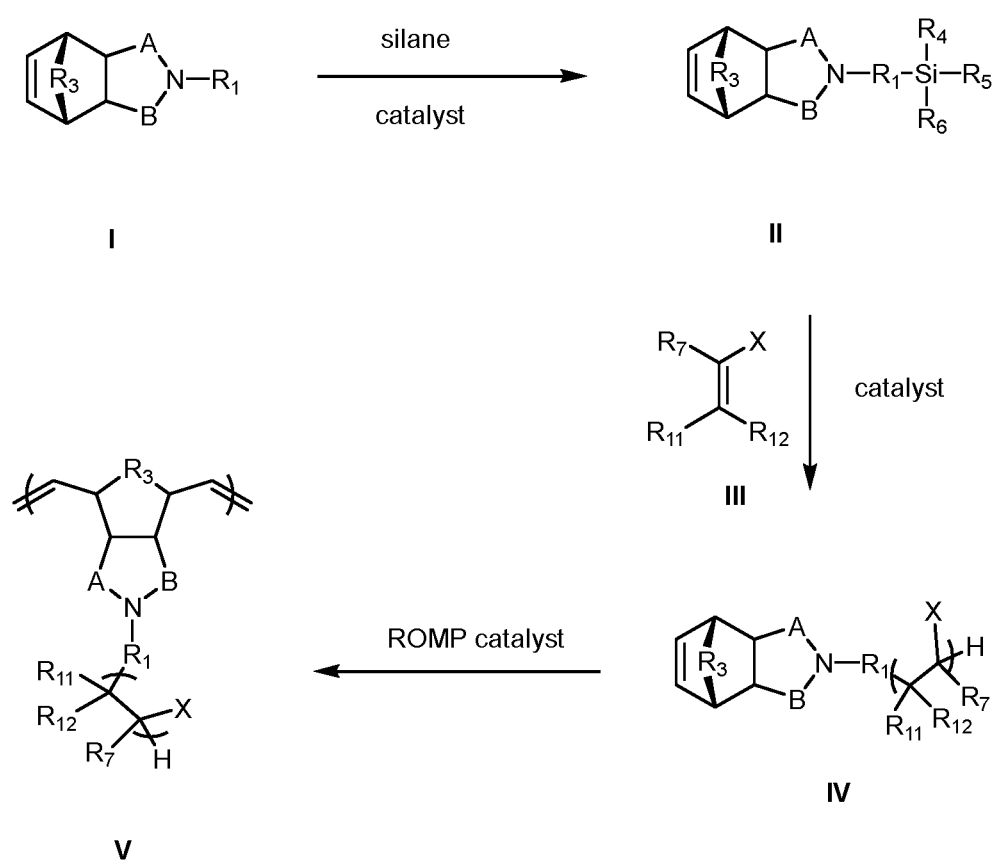
FIG. 1 illustrates an exemplary Reaction Scheme according to an embodiment of the disclosure.

IV and contacting a compound comprising Formula (IV) with a ring opening metathesis polymerization catalyst to prepare a compound comprising Formula (V), according to the Reaction Scheme depicted in FIG. 1.

Generally, in accordance with embodiments of the Reaction Scheme depicted in FIGS. 1. A and B are independently selected from a group consisting of $CH_2$ or $C=O$. In certain embodiments, A and B are independently selected from a group consisting of $CH_2$ or $C=O$. In specific embodiments, A and B are $C=O$.

In general, in accordance with embodiments of the Reaction Scheme depicted in FIG. 1, $R_1$ may be selected from a group consisting of substituted or unsubstituted $C_1$-$C_{10}$CH, substituted or unsubstituted arylOH, substituted or unsubstituted $C_1$-$C_{10}$COR$_7$, substituted or unsubstituted arylCOR$_7$, substituted or unsubstituted $C_1$-$C_{10}$OCOCH=CH$_2$, substituted or unsubstituted arylOCOCH=CH$_2$, substituted or unsubstituted $C_1$-$C_{10}$OCOC(CH$_3$)=CH$_2$, substituted or unsubstituted arylOCOC(CH$_3$)=CH$_2$, substituted or unsubstituted $C_1$-$C_{10}$NHCOCH=CH$_2$, or substituted or unsubstituted arylNHCOCH=CH$_2$. In some embodiments, $R_1$ may be selected from substituted or unsubstituted $C_1$-$C_6$OH, substituted or unsubstituted arylOH, substituted or unsubstituted $C_1$-$C_6$COR$_4$, substituted or unsubstituted arylCOR$_4$, substituted or unsubstituted $C_1$-$C_6$OCOCH=CH$_2$, substituted or unsubstituted arylOCOCH=CH$_2$, substituted or unsubstituted $C_1$-$C_6$OCOC(CH$_3$)=CH$_2$, substituted or unsubstituted arylOCOC(CH$_3$)=CH$_2$, substituted or unsubstituted $C_1$-$C_6$NHCOCH=CH$_2$, or substituted or unsubstituted arylNHCOCH=CH$_2$. In other embodiments, $R_1$ may be selected from substituted or unsubstituted $C_1$-$C_4$OH, substituted or unsubstituted arylOH, substituted or unsubstituted $C_1$-$C_4$COR$_4$, substituted or unsubstituted arylCOR$_4$, substituted or unsubstituted $C_1$-$C_4$OCOCH=CH$_2$, substituted or unsubstituted arylOCOCH=CH$_2$, substituted or unsubstituted $C_1$-$C_4$OCOC(CH$_3$)=CH$_2$, substituted or unsubstituted arylOCOC(CH$_3$)=CH$_2$, substituted or unsubstituted $C_1$-$C_4$NHCOCH=CH$_2$, or substituted or unsubstituted arylNHCOCH=CH$_2$. In specific embodiments, $R_1$ may be selected from a group consisting of —CH$_2$CH$_2$OCOCH=CH$_2$, —CH$_2$CH$_2$OCOC(CH$_3$)=CH$_2$, —CH$_2$CH$_2$NHCOCH=CH$_2$.

In accordance with embodiments of the Reaction Scheme depicted in FIG. 1, $R_3$ is a CHR$_8$ or O. In certain embodiments, $R_3$ is —CH$_2$— or O. In specific embodiments, $R_3$ is —CH$_2$—.

In accordance with embodiments of the Reaction Scheme depicted in FIG. 1, $R_4$, $R_5$, and $R_6$ are independently selected from a group consisting of H, $C_1$-$C_8$ substituted or unsubstituted alkyl, or substituted or unsubstituted aryl. In some embodiments, $R_4$, $R_5$, and $R_6$ may be independently selected from a group consisting of H, $C_1$-$C_4$ substituted or unsubstituted alkyl, or substituted or unsubstituted aryl. In certain embodiments, $R_4$, $R_5$, and $R_6$ may be independently selected from a group consisting of $C_1$-$C_4$ substituted or unsubstituted alkyl, or substituted or unsubstituted aryl. In specific embodiments, $R_4$, $R_5$, and $R_6$ are selected from a group consisting of methyl, tert-butyl, or phenyl.

In accordance with embodiments of the Reaction Scheme depicted in FIG. 1, $R_7$ is selected from a group consisting of hydrogen, or substituted or unsubstituted $C_1$-$C_{10}$ alkyl. In various embodiments, $R_7$ may be selected from a group consisting of hydrogen, or substituted or unsubstituted $C_1$-$C_8$ alkyl. In specific embodiments, $R_7$ may be selected from a group consisting of hydrogen, methyl, or ethyl.

In accordance with further embodiments of the Reaction Scheme depicted in FIG. 1, X is CN, COOR$_8$, or CONR$_9$R$_{10}$; and R$_8$, R$_9$, and R$_{10}$ are independently selected from a group consisting of hydrogen, $C_1$-$C_{10}$ substituted or unsubstituted alkyl optionally substituted with at least one heteroatom on the alkyl chain, substituted or unsubstituted aryl, or substituted or unsubstituted heteroaryl. In some embodiments, X is CN, COOR$_8$, or CONR$_9$R$_{10}$; and R$_8$, R$_9$, and R$_{10}$ may be are independently selected from a group consisting of hydrogen, $C_1$-$C_6$ substituted or unsubstituted alkyl optionally substituted with at least one heteroatom on the alkyl chain, substituted or unsubstituted aryl, or substituted or unsubstituted heteroaryl. In certain embodiments, X may be COOR$_8$ or CONR$_9$R$_{10}$; and R$_8$, R$_9$, and R$_{10}$ may be independently selected from a group consisting of are independently selected from a group consisting of hydrogen, $C_1$-$C_4$ substituted or unsubstituted alkyl optionally substituted with at least one heteroatom on the alkyl chain, substituted or unsubstituted aryl, or substituted or unsubstituted heteroaryl. In specific embodiments, X is OR$_8$; and R$_8$ is selected from a group consisting of hydrogen, methyl, ethyl, 2-methoxymethyl, n-butyl, iso-butyl, or 2-ethylhexyl.

In accordance with further embodiments of the Reaction Scheme depicted in FIG. 1, $R_{11}$ and $R_{12}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl. In some embodiments, $R_{11}$ and $R_{12}$ are independently selected from a group consisting of H, $C_1$-$C_6$ substituted or unsubstituted alkyl optionally substituted with at least one heteroatom on the alkyl chain, substituted or unsubstituted aryl, or substituted or unsubstituted heteroaryl. In certain embodiments, $R_{11}$ and $R_{12}$ are independently selected from a group consisting of H, $C_1$-$C_4$ substituted or unsubstituted alkyl optionally substituted with at least one heteroatom on the alkyl chain, substituted or unsubstituted aryl, or substituted or unsubstituted heteroaryl. In specific embodiments, $R_{11}$ and $R_{12}$ are H.

In certain embodiments of the reaction scheme illustrated in FIG. 1, $R_1$ is selected from a group consisting of substituted or unsubstituted $C_1$-$C_{10}$OH, substituted or unsubstituted arylOH, substituted or unsubstituted $C_1$-$C_{10}$COR$_7$, substituted or unsubstituted arylCOR$_7$, substituted or unsubstituted $C_1$-$C_{10}$OOCH=CH$_2$, substituted or unsubstituted arylOCOCH=CH$_2$, substituted or unsubstituted $C_1$-$C_{10}$OCOC(CH$_3$)=CH$_2$, substituted or unsubstituted arylOCOC(CH$_3$)=CH$_2$, substituted or unsubstituted $C_1$-$C_{10}$NHCOCH=CH$_2$, or substituted or unsubstituted arylNHCOCH=CH$_2$; R$_3$ is a —CH$_2$—, or O; R$_4$, R$_5$, and R$_6$ are independently selected from a group consisting of H, $C_1$-$C_8$ substituted or unsubstituted alkyl, or substituted or unsubstituted aryl; R$_7$ is selected from a group consisting of hydrogen, or substituted or unsubstituted $C_1$-$C_{10}$ alkyl; X is OR$_8$ or NR$_9$R$_{10}$; R$_8$, R$_9$, and R$_{10}$ are independently selected from a group consisting of hydrogen, $C_1$-$C_{10}$ substituted or unsubstituted alkyl optionally substituted with at least one heteroatom on the alkyl chain, substituted or unsubstituted aryl, or substituted or unsubstituted heteroaryl; and R$_{11}$ and R$_{12}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl.

(a) Initiation Reaction of Step (a)

As discussed above, Step (a) involves contacting the initiating compound comprising Formula (I) with a silane in the presence of a Lewis acid catalyst to form the compound comprising Formula (II). Contacting between the compound comprising Formula (I) and the silane in the presence of a catalyst entails silylation of the terminal functional group in $R_1$.

The initiating compound comprising Formula (I) is detailed above. In some embodiments, A and B are independently selected from CH$_2$ or C=O; $R_1$ may be selected from substituted or unsubstituted $C_1$-$C_6$OH, substituted or unsubstituted arylOH, substituted or unsubstituted $C_1$-$C_6$COR$_7$, substituted or unsubstituted arylCOR$_7$, substituted or unsubstituted $C_1$-$C_6$OCOCH=CH$_2$, substituted or unsubstituted arylOCOCH=CH$_2$, substituted or unsubstituted $C_1$-$C_6$OCOC(CH$_3$)=CH$_2$, substituted or unsubstituted arylOCOC(CH$_3$)=CH$_2$, substituted or unsubstituted $C_1$-$C_6$NHCOCH=CH$_2$, or substituted or unsubstituted arylNHCOCH=CH$_2$ and $R_3$ is either CHR$_8$ or O. In other embodiments, A and B are independently selected from CH$_2$ or C=O; $R_1$ may be selected from substituted or unsubstituted $C_1$-$C_4$OH, substituted or unsubstituted arylOH, substituted or unsubstituted $C_1$-$C_4$COR$_7$, substituted or unsubstituted arylCOR$_7$, substituted or unsubstituted $C_1$-$C_4$OCOCH=CH$_2$, substituted or unsubstituted arylOCOCH=CH$_2$, substituted or unsubstituted $C_1$-$C_4$OCOC(CH$_3$)=CH$_2$, substituted or unsubstituted arylOCOC(CH$_3$)=CH$_2$, substituted or unsubstituted $C_1$-$C_4$NHCOCH=CH$_2$, or substituted or unsubstituted arylNHCOCH=CH$_2$ and $R_3$ is either —CH$_2$ or O. In preferred embodiments, A and B are C=O; $R_1$ is selected from a group consisting of —CH$_2$CH$_2$OCOCH=CH$_2$, —CH$_2$CH$_2$OCOC(CH$_3$)=CH$_2$, —CH$_2$CH$_2$NHCOCH=CH$_2$ and $R_3$ is —CH$_2$—, and the compound comprising Formula (I) may be 2-propenoic acid, 2-[(3aR,4R,7S,7aS)-octahydro-1,3-dioxo-4,7-methano-2H-isoindol-2-yl]ethyl ester; 2-propenoic acid, 2-methyl-, 2-[(3aR,4R,7S,7aS)-octahydro-1,3-dioxo-4,7-methano-2H-isoindol-2-yl]ethyl ester; or 2-((4R,7S)-1,3-dioxo-1,3,3a,4,7,7a-hexahydro-2H-4, 7-methanoisoindol-2-yl)ethyl methacrylate.

Numerous silanes are useful in the above described process. Various silanes are detailed above. The silane in the presence of the catalyst introduces a silyl group on the nucleophilic of the compound comprising Formula (I). In some embodiments, this process step may be referred to as hydrosilylation. Non-limiting examples of suitable silanes may be trimethylsilane, dimethylethylsilane, dimethyl(isopropyl)silane, diethylmethylsilane, dimethylpropylsilane, triisopropylsilane, t-butyldimethylsilane, dimethylpentylsilane, bis(t-butyl)methylsilane, dimethylphenylsilane, diethylphenylsilane, or methylbutylphenylsilane.

In general, the mole ratio of the silane to the compound comprising Formula (I) may range from about 0.95:1.00 to about 1.50:1.00. In various embodiments, the mole ratio of the silane to the compound comprising Formula (I) may range from about 1.00:1.00 to about 1.50:1.00, from about 1.10:1.00 to about 1.40:1.00, or from about 1:20:1.00 to about 1.05:1.00. In various embodiments, mole ratio of the silane to the compound comprising Formula (I) may range from about 1.00:1.00 to about 1.10:1.00.

In various embodiments, step (a) utilizes a catalyst. In one embodiment, the catalyst useful in step (a) of the process may be a Lewis acid catalyst. A wide variety of Lewis acid catalysts may be used in the process. Non-limiting examples of suitable Lewis acid catalysts may be boron trichloride, boron trifluoride etherate, trimethylsilyltriflate, titanium tetrachloride, aluminum chloride, silicon tetrafluoride, tris (pentafluorophenyl)boron, aluminum isopropoxide, tin tetrachloride, boron trichloride, or trimethylsilylNTf$_2$. In one preferred embodiment, the catalyst useful in step (a) is tris(pentafluorophenyl)boron.

In general, the mole ratio of the catalyst to the compound comprising formula (I) may range from 0.001:1.0 to about 0.1:1.0. In various embodiments, the mole ratio of the catalyst to the compound comprising formula (I) may range from 0.001:1.0 to about 0.1:1.0, from about 0.005:1.0 to about 0.05:1.0, or from about 0.007 to about 0.03:1.0.

The reaction mixture, as detailed herein, may also optionally comprise a solvent. As recognized by those of skill in the art, the solvent can and will vary depending on the starting substrates, the catalyst, and the silane used in the process. The solvent may be a polar protic solvent, a polar aprotic solvent, a non-polar solvent, or combinations thereof. Suitable examples of polar protic solvents include, but are not limited to, water; alcohols such as methanol, ethanol, isopropanol, n-propanol, isobutanol, n-butanol, s-butanol, t-butanol, and the like; diols such as propylene glycol; organic acids such as formic acid, acetic acid, and so forth; amines such as trimethylamine, or triethylamine, and the like; amides such as formamide, acetamide, and so forth; and combinations of any of the above. Non-limiting examples of suitable polar aprotic solvents include acetonitrile, dichloromethane (DCM), diethoxymethane, N,N-dimethylacetamide (DMAC), N,N-dimethylformamide (DMF), dimethyl sulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, 1,4-dioxane, N-methyl-2-pyrrolidinone (NMP), ethyl formate, formamide, hexamethylphosphoramide, N-methyl acetamide, N-methylformamide, methylene chloride, nitrobenzene, nitromethane, propionitrile, sulfolane, tetramethylurea, tetrahydrofuran (THF), 2-methyltetrahydrofuran, trichloromethane, and combinations thereof. Suitable examples of non-polar solvents include, but are not limited to, alkane and substituted alkane solvents (including cycloalkanes), aromatic hydrocarbons, esters, ethers, combinations thereof, and the like. Specific non-polar solvents that may be employed include, for example, benzene, butyl acetate, t-butyl methylether, chlorobenzene, chloroform, chloromethane, cyclohexane, dichloromethane, dichloroethane, diethyl ether, ethyl acetate, diethylene glycol, fluorobenzene, heptane, hexane, isopropyl acetate, methyltetrahydrofuran, pentyl acetate, n-propyl acetate, tetrahydrofuran, toluene, and combinations thereof. In one exemplary embodiment, the solvent may be a combination of polar solvents. In one preferred embodiment, the solvent used in the process may be dichloromethane.

In general, the volume to weight ratio of the solvent to the compound comprising Formula (I) will range from about 0.5:1 to about 100:1. In various embodiments, the volume to weight ratio of the solvent to the compound comprising Formula (I) may range from about 0.5:1 to about 100:1, from about 2:1 to about 80:1, from about 5:1 to about 50:1, or from about 10:1 to about 40:1. In an exemplary embodiment, the volume to weight ratio of the solvent to the compound comprising Formula (I) may range from about 3:1 to about 20:1.

In general, the reaction of step (a) will be conducted at a temperature that ranges from about −10° C. to about 80° C. In various embodiments, the temperature of the reaction may range from about −10° C. to about 0° C., 0° C. to about 10° C., 10° C. to about 20° C., from about 20° C. to about 30° C., from about 30° C. to about 40° C., from about 40° C. to about 60° C., or from about 60° C. to about 80° C. In one embodiment, the reaction may be conducted at temperature that ranges from about 10° C. to about 40° C., or from about 20° C. to about 30° C. In another embodiment, the temperature of the reaction may be about room temperature (~23° C.). The reaction typically is performed under ambient pressure. The reaction may also be conducted under an inert atmosphere, for example under nitrogen, argon or helium.

Generally, the reaction is allowed to proceed for a sufficient period of time until the reaction is complete, as determined by any method known to one skilled in the art, such as proton nuclear magnetic resonance (e.g., $^1$H NMR). The duration of the reaction may range from about 5 minutes to about 24 hours. In some embodiments, the duration of the reaction may range from about 5 minutes to about 30 minutes, from about 30 minutes to about 2 hours, from about 2 hours to about 4 hours, from about 4 hours to about 10 hours, from about 10 hours to about 15 hours, or from about 15 hours to about 24 hours. In an exemplary embodiment, the reaction may be allowed to proceed for about 0.5 hour to about 2 hours. In this context, a "completed reaction" generally means that the reaction mixture contains a significantly diminished amount of the compound of Formula (I). Typically, the amount of the compound of Formula (I) remaining in the reaction mixture at the end of the reaction may be less than about 10%, less than about 5%, or less than about 2%.

The compound comprising Formula (II) may have a yield of at least about 50%. In various embodiments, the compound comprising Formula (II) may have a yield of at least about 50%, at least about 60%, at least about 65%, at least about 70%, at least about 75%, at least about 80%, at least about 85%, at least about 90%, at least about 95%, or at least about 99%.

Generally, the reaction mixture after step (a) may be worked-up in a variety of methods. In some embodiments, the reaction mixture directly from step (a) may be used directly without purification in step (b). In other embodiments, the reaction mixture may be evaporated under reduced pressure to remove volatile impurities. In yet other embodiments, the reaction mixture may be distilled (at atmospheric pressure or under reduced pressure) to not only remove impurities but also distill the compound comprising Formula (II). In all cases, as appreciated from the skilled artisan, contacting the reaction mixture comprising the compound comprising Formula (II) with an aqueous solution will cleave the silyl group on $R_1$ and revert back to the compound of Formula (I).

(b) Group Transfer Polymerization of Step (b)

As discussed herein, the methods of the present disclosure include a second step, step (b), which comprises contacting the compound comprising Formula (II) with a monomer comprising Formula (III) using a group transfer polymerization (GTP) to prepare the compound comprising Formula (IV), optionally in the presence of a catalyst.

The compound comprising Formula (II) and Formula (III) is described above and herein. By way of example, in some embodiments, $R_7$ may be may be selected from a group consisting of hydrogen, or substituted or unsubstituted $C_1$-$C_6$ alkyl; and $R_{11}$ and $R_{12}$ are independently selected from a group consisting of H, $C_1$-$C_6$ substituted or unsubstituted alkyl optionally substituted with at least one heteroatom on the alkyl chain, substituted or unsubstituted aryl, or substituted or unsubstituted heteroaryl. In specific embodiments, $R_7$ may be selected from a group consisting of hydrogen, methyl, 2-methoxymethyl, n-butyl, iso-butyl, or 2-ethylhexy; and $R_{11}$ and $R_{12}$ are hydrogen. In some embodiments, X may be CN, $COOR_8$ or $CONR_9R_{10}$; and $R_8$, $R_9$, and $R_{10}$ may be independently selected from a group consisting of H, $C_1$-$C_6$ substituted or unsubstituted alkyl, or substituted or unsubstituted aryl. In certain embodiments, X may be CN, $COOR_8$ or $CONR_9R_{10}$; and $R_8$, $R_9$, and $R_{10}$ may be independently selected from a group consisting of H, $C_1$-$C_4$ substituted or unsubstituted alkyl, or substituted or unsubstituted aryl. In specific embodiments, X is $COOR_8$; and $R_8$ is selected from a group consisting of hydrogen, methyl, or ethyl. Non-limiting examples of compounds comprising Formula (III) may be n-butyl acrylate, 2-methoxyethyl acrylate, methyl methacrylate, 2-ethylhexyl methacrylate, and isobutyl acrylate.

Generally, the mole ratio of the monomer comprising Formula (III) with the compound comprising Formula (I) may range from about 10.0:1.0 to 100.0:1.0. In various embodiments, the mole ratio of the monomer comprising Formula (III) with the compound comprising Formula (I) may range from about 10.0:1.0 to 100.0:1.0, from about 20.0:1.0 to about 80.0:1.0, from about 30.0:1.0 to about 70.0:1.0, or from about 40.0:1.0 to about 60.0:1.0.

The group transfer polymerization may take place in the presence of catalyst. Without intending to be limited, in certain aspects of the disclosure it has surprisingly been found that the use of a second catalyst enables superior reactivity in the GTP process. The catalyst of the group transfer polymerization of step (b) may be the same or different than used in the initiation reaction of step (a). The catalyst may be carried over from step (a), such that additional catalyst may not need to be added to the reaction mixture. In one embodiment, the catalyst in step (b) is a Lewis Acid catalyst. A wide variety of Lewis acid catalysts may be used in the process. The catalyst in step (b) may be the same or different than step (a). In particular embodiments, e.g., when Formula III comprises a methacrylate monomer, it may be preferred to utilize a different Lewis Acid catalyst in step (b) as compared to step (a). Non-limiting examples of suitable Lewis acid catalysts may be boron trichloride, boron trifluoride etherate, trimethylsilyltriflate, titanium tetrachloride, aluminum chloride, silicon tetrafluoride, tris(pentafluorophenyl)boron, aluminum isopropoxide, tin tetrachloride, or trimethylsilylNTf$_2$ (TMSNTf2). In one preferred embodiment, the catalyst useful in step (b) is TMSNTf$_2$.

In general, the mole ratio of the catalyst to the compound comprising Formula (I) may range from 0.001:1.0 to about 0.1:1.0. In various embodiments, the mole ratio of the catalyst to the compound comprising Formula (I) may range from 0.001:1.0 to about 0.1:1.0, from about 0.005:1.0 to about 0.05:1.0, or from about 0.007 to about 0.03:1.0. In various embodiments, the mole ratio of the catalyst to the compound comprising Formula (I) may be about 0.06:1.0.

Depending on how the reaction mixture from step (b) is worked up, the reaction mixture, as detailed herein, may further comprise an optional solvent. Appropriate solvents are detailed herein and above.

In general, if a solvent is needed, the volume to weight ratio of the solvent to the compound comprising Formula (I) will range from about 0.5:1 to about 50:1. In various embodiments, the volume to weight ratio of the solvent to the compound comprising Formula (I) may range from about 0.5:1 to about 2:1, from about 2:1 to about 5:1, from about 5:1 to about 25:1, or from about 25:1 to about 50:1. In an exemplary embodiment, the volume to weight ratio of the solvent to the compound comprising Formula (I) may range from about 5:1 to about 20:1.

In general, the reaction of step (b) will be conducted at a temperature that ranges from about −10° C. to about 80° C. In various embodiments, the temperature of the reaction may range from about −10° C. to about 0° C., 0° C. to about 10° C., 10° C. to about 20° C., from about 20° C. to about 30° C., from about 30° C. to about 40° C., from about 40° C. to about 60° C., or from about 60° C. to about 80° C. In one embodiment, the reaction may be conducted at temperature that ranges from about 10° C. to about 40° C., or from about 20° C. to about 30° C. In another embodiment, the temperature of the reaction may be about room temperature (~23° C.). The reaction typically is performed under ambient pressure. The reaction may also be conducted under an inert atmosphere, for example under nitrogen, argon or helium.

Generally, the reaction is allowed to proceed for a sufficient period of time until the reaction is complete, as determined by any method known to one skilled in the art, such as NMR (e.g., $^1$H NMR). The duration of the reaction may range from about 5 minutes to about 24 hours. In some embodiments, the duration of the reaction may range from about 5 minutes to about 30 minutes, from about 30 minutes to about 2 hours, from about 2 hours to about 4 hours, from about 4 hours to about 10 hours, from about 10 hours to about 15 hours, or from about 15 hours to about 24 hours. In an exemplary embodiment, the reaction may be allowed to proceed for about 2 hours. In this context, a "completed reaction" generally means that the reaction mixture contains a significantly diminished amount of the compound of Formula (II). Typically, the amount of the compound of Formula (II) remaining in the reaction mixture at the end of the reaction may be less than about 10%, less than about 5%, or less than about 2%.

Generally, the reaction mixture after step (b) may be worked-up in a variety of methods known in the art, for example, chromatography or running the reaction mixture through a plug of silica, alumina, or combinations thereof.

The compound comprising Formula (IV) or after conducting steps (a) and (b) may have a yield of at least about 60%. In various embodiments, the compound comprising Formula (II) may have a yield of at least about 60%, at least about 65%, at least about 70%, at least about 75%, at least about 80%, at least about 85%, at least about 90%, at least about 95%, or at least about 99%.

(c) Ring Opening Metathesis Polymerization of Step (c)

As described herein, the methods of the disclosure include a third reaction step, step (c), which comprises contacting the compound comprising Formula (IV) using a catalyst to form a compound comprising Formula (V). As appreciated by the skilled artisan, this process step may be termed a "ring opening metathesis polymerization" or "ROMP."

The compound comprising Formula (IV) is described in more detail herein and above.

A wide variety of catalysts may be used. In one aspect, the catalyst may be either homogeneous or heterogeneous. Generally, these catalysts affect a ring opening metathesis polymerization reaction. In various embodiments, the catalyst comprises an iridium, a ruthenium or a molybdenum catalyst. As appreciated by the skilled artisan, the catalyst may be referred as ruthenium(II) carbenoid complexes or third generation "Grubbs" catalyst (G3). Other catalysts which affect this conversion are known as "Schrock" catalyst which are molybdenum(VI)- and tungsten(VI)-based centers supported by alkoxide and imido ligands or "Boyston Photocatalyst" which are iridium, pyrylium, or thiopyryium based catalysts.

In general, the mole ratio of the catalyst to the compound comprising formula (IV) may range from 0.001:1.0 to about 0.1:1.0. In various embodiments, the mole ratio of the catalyst to the compound comprising formula (IV) may range from 0.001:1.0 to about 0.1:1.0, from about 0.005:1.0 to about 0.05:1.0, or from about 0.007 to about 0.03:1.0. In one embodiment, the mole ratio of the catalyst to the compound comprising Formula (IV) may be about 0.01:1.0.

A list of suitable optional solvents is detailed herein and above. A preferred optional solvent in step (c) is dichloromethane.

In general, the reaction of step (c) will be conducted at a temperature that ranges from about −10° C. to about 80° C. In various embodiments, the temperature of the reaction may range from about −10° C. to about 0° C., 0° C. to about 10° C., 10° C. to about 20° C., from about 20° C. to about 30° C., from about 30° C. to about 40° C., from about 40° C. to about 60° C., or from about 60° C. to about 80° C. In one embodiment, the reaction may be conducted at temperature that ranges from about 10° C. to about 40° C., or from about 20° C. to about 30° C. In another embodiment, the temperature of the reaction may be about room temperature (~23° C.). The reaction typically is performed under ambient pressure. The reaction may also be conducted under an inert atmosphere, for example under nitrogen, argon or helium.

Generally, the reaction is allowed to proceed for a sufficient period of time until the reaction is complete, as determined by any method known to one skilled in the art, such as gel permeation chromatography (e.g., GPC) or NMR (e.g., $^1$H NMR). The duration of the reaction may range from about 5 minutes to about 24 hours. In some embodiments, the duration of the reaction may range from about 5 minutes to about 30 minutes, from about 30 minutes to about 2 hours, from about 2 hours to about 4 hours, from about 4 hours to about 10 hours, from about 10 hours to about 15 hours, or from about 15 hours to about 24 hours. In an exemplary embodiment, the reaction may be allowed to proceed for about 2 hours. In this context, a "completed reaction" generally means that the reaction mixture contains a significantly diminished amount of the compound of Formula (II). Typically, the amount of the compound of Formula (II) remaining in the reaction mixture at the end of the reaction may be less than about 10%, less than about 5%, or less than about 2%.

Generally, the reaction mixture after step (c) may be worked-up in a variety of methods known in the art, e.g., by quenching the catalyst and precipitation of the brush polymer.

The compound comprising Formula (V) may have a yield of at least about 60%. In various embodiments, the compound comprising Formula (II) may have a yield of at least about 60%, at least about 65%, at least about 70%, at least about 75%, at least about 80%, at least about 85%, at least about 90%, at least about 95%, or at least about 99%.

In accordance with aspects of the disclosure, the compound comprising Formula (V) or the brush polymer has a controlled molecular weight due to the stoichiometry of the monomer comprising Formula (III) to the catalyst in step (c).

In general, the average molecular weight observed (M nobs) of the compounds comprising Formula (V) may range from 0.5 to 10.0 kDa. In various embodiments, the average molecular weight observed (M nobs) of the compounds comprising Formula (V) may range from 0.5 to 10.0 kDa, from about 2.0 to about 6.0, or from about 3.0 to about 5.0.

Generally, the weight average molecular weight divided by the number average molecular weight observed may range from about 1.00 to about 1.30. In various embodiments, the weight average molecular weight divided by the number average molecular weight observed may range from about 1.00 to about 1.30, from about 1.00 to about 1.20, or from 1.00 to about 1.09.

(d) Exemplary Embodiments

In connection with the compounds of the Formulas disclosed herein and the methods of the disclosure, exemplary embodiments include wherein $R_1$ is, —CH$_2$CH$_2$OCOC(CH$_3$)=CH$_2$; $R_3$ is —CH$_2$—, $R_4$ and $R_5$ are methyl, $R_6$ is phenyl, $R_7$ is selected from a group consisting of hydrogen, methyl, 2-methoxymethyl, n-butyl, iso-butyl, or 2-ethylhexyl, X is COOR$_8$; $R_8$ is selected from a group consisting of hydrogen, methyl, or ethyl, and $R_{11}$ and $R_{12}$ are hydrogen. The silane and the catalyst in step (a) is dimethylphenyl silane is tris(pentafluorophenyl)boron in a 1,4-hydrosilylation reaction. In step (b) the monomer is n-butyl acrylate, 2-methoxyethyl acrylate, methyl methacrylate, 2 ethylhexyl methacrylate, or isobutyl methacrylate and the catalyst is TMSNTf$_2$ in a Mukaiyama-Michael reaction. For step (c) of the three step process, the intermediate from step (b) after running through a silica gel plug, is contacted with dichloro[1,3-bis(2,4,6-trimethylphenyl)-2-imidazolidinylidene](benzylidene)bis(pyridine)ruthenium(II) in a ring opening metathesis polymerization reaction producing the brush polymer.

In some exemplary embodiments, the mole ratio of the silane to the compound comprising Formula (I) may be about 0.95:1.00 to about 1.50:1.00, the mole ratio of the catalyst to the compound comprising Formula (I) may be 0.001:1.0 to about 0.1:1.0 and may be conducted in dichloromethane at room temperature in a 1,4-hydrosilynation reaction. The intermediate, the compound comprising Formula (II) is not isolated by used directly in the next process step. The next process step, step (b) comprises a group transfer polymerization using a Mukaiyama-Michael reaction by contacting the intermediate from process step (a) with the monomer comprising Formula (III) in the presence of a catalyst. The molar ratio of the compound comprising Formula (III) may be about 10.0:1.0 to about 100.0:1.0 and the mole ratio of the catalyst to the compound comprising Formula (I) is about 0.01:1.0. This process step may be conducted in dichloromethane at room temperature. The compound comprising Formula (IV) is isolated by silica gel chromatography, precipitation into a non-solvent, purification by stirring in the presence of solid state functionalized resins, or selective adsorbents. The final step of the process, step (c), is a ring opening metathesis polymerization forming using a Grubb's third generation catalyst at room temperature forming the brush polymer. The mole ratio of the Grubb's third generation catalyst to the compound comprising Formula (IV) may be 0.001:1.0 to about 0.1:1.0. The yield of this three step process is generally greater than 80%.

Figure 2:
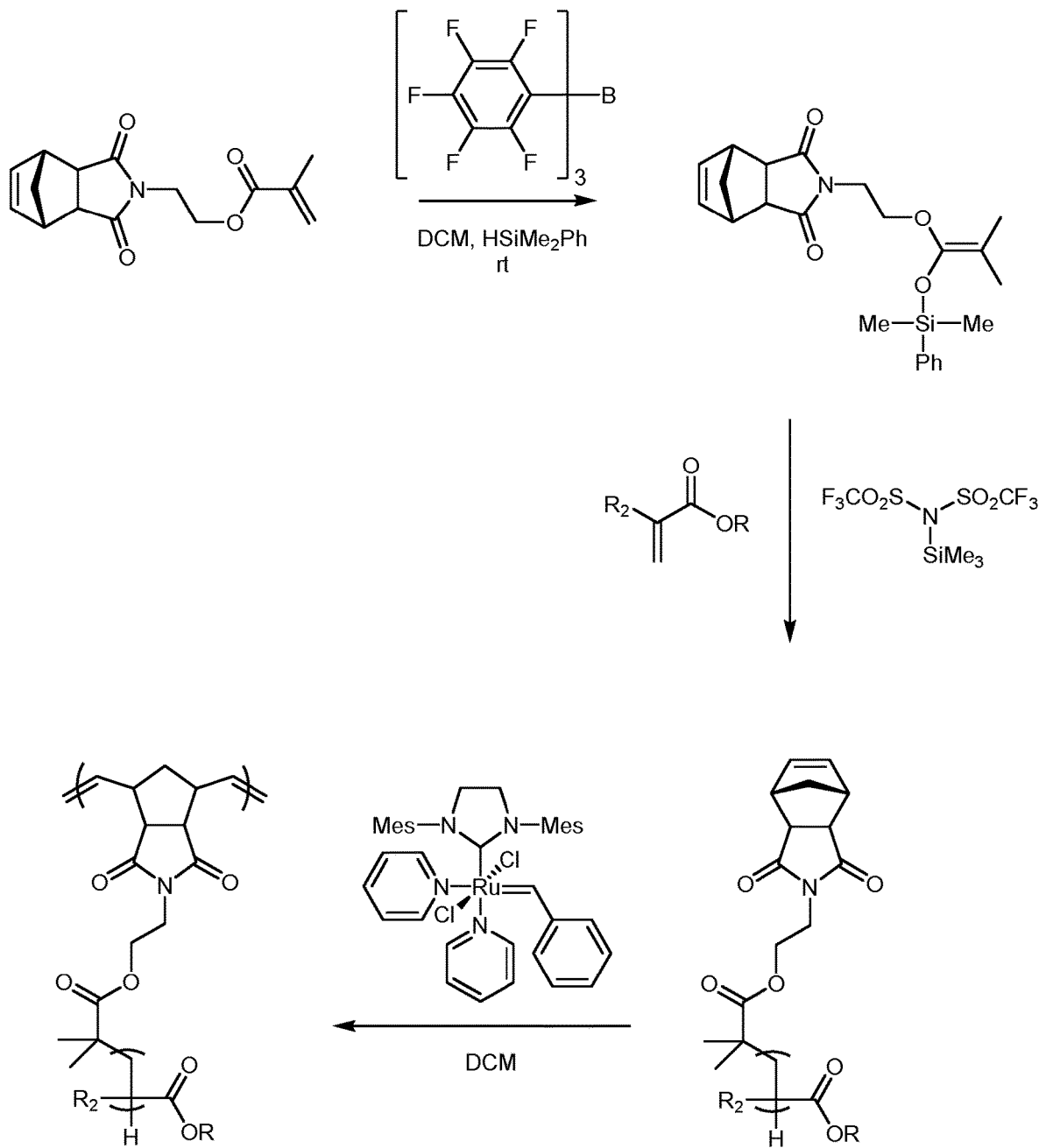
FIG. 2 illustrates an exemplary Reaction Scheme according to an embodiment of the disclosure.

In a particular embodiment, the process disclosed herein may be used to prepare the brush polymer or the compound comprising Formula (V), as depicted in the Reaction Scheme of FIG. 2.

(II) Methods of the Disclosure, Preparation of Compounds of Formula (IX)

Another aspect of the present disclosure provides a process for preparing the compound of Formula (IXA) and/or (IXB):

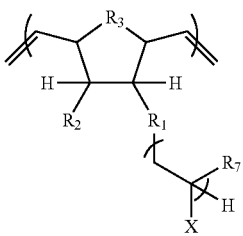

IXA

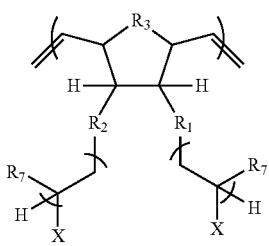

IXB

The process comprises contacting a compound comprising Formula (VI):

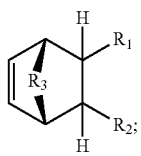

VI in the presence of a silane and a catalyst to form a compound comprising Formula (VIIA) and/or (VIIB):

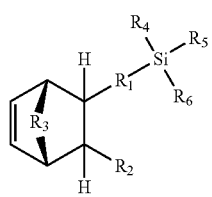

VIIA

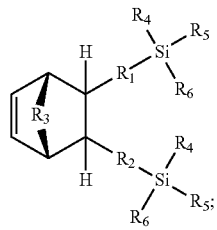

VIIB contacting the compound comprising Formula (VIIA) and/or Formula (VIIB) with a monomer comprising Formula (III) in the presence of a catalyst:

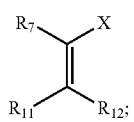

III to prepare a compound comprising Formula (VIIIA) and/or (VIIIB):

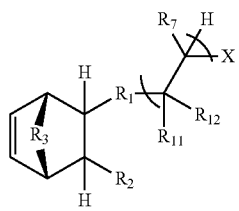

VIIIA

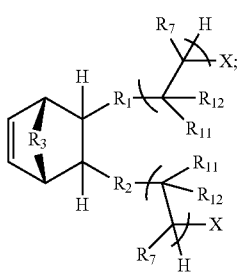

Figure 3:
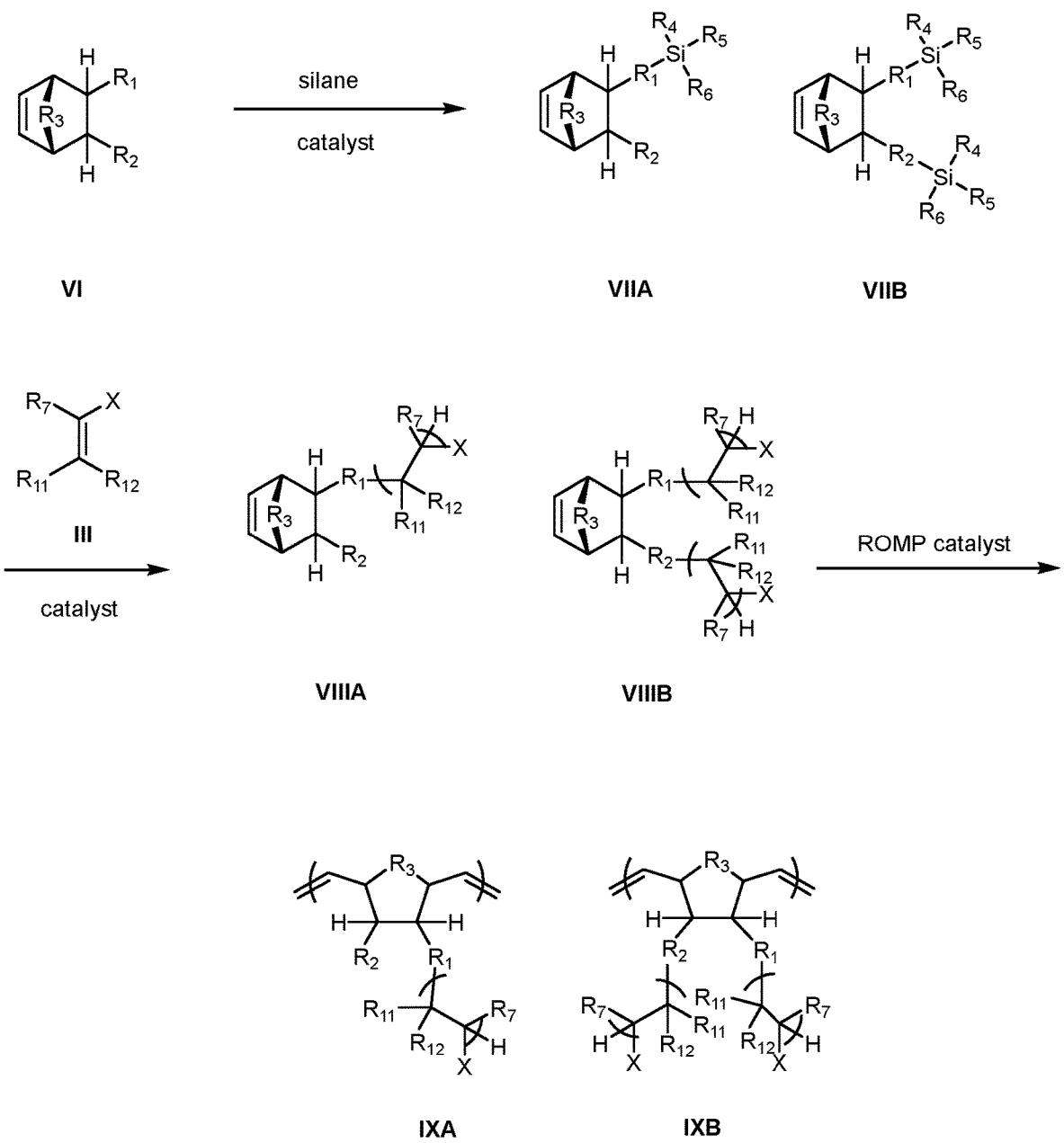
FIG. 3 illustrates an exemplary Reaction Scheme according to an embodiment of the disclosure.

VIIIB and contacting a compound comprising Formula (VIII) with a ring opening metathesis polymerization catalyst to prepare a compound comprising Formula (IX), according to the Reaction Scheme of FIG. 3:

In accordance with embodiments of the Reaction Scheme depicted in FIG. 3, $R_1$ is selected from a group consisting of substituted or unsubstituted $C_1$-$C_{10}$CH, substituted or unsubstituted arylOH, substituted or unsubstituted $C_1$-$C_{10}$COR$_4$, substituted or unsubstituted arylCOR$_4$, substituted or unsubstituted $C_1$-$C_{10}$OCOCCH=CH$_2$, substituted or unsubstituted arylOCOCH=CH$_2$, substituted or unsubstituted $C_1$-$C_{10}$OCOC(CH$_3$)=CH$_2$, substituted or unsubstituted arylOCOC(CH$_3$)=CH$_2$, substituted or unsubstituted $C_1$-$C_{10}$NHCOCH=CH$_2$, or substituted or unsubstituted arylNHCOCH=CH$_2$. In some embodiments, $R_1$ may be selected from substituted or unsubstituted $C_1$-$C_6$OH, substituted or unsubstituted arylOH, substituted or unsubstituted $C_1$-$C_6$COR$_4$, substituted or unsubstituted arylCOR$_4$, substituted or unsubstituted $C_1$-$C_6$OCOCH=CH$_2$, substituted or unsubstituted arylOCOCH=$CH_2$, substituted or unsubstituted $C_1$-$C_6$OCOC($CH_3$)=$CH_2$, substituted or unsubstituted arylOCOC($CH_3$)=$CH_2$, substituted or unsubstituted $C_1$-$C_6$NHCOCH=$CH_2$, or substituted or unsubstituted arylNHCOCH=$CH_2$. In other embodiments, $R_1$ may be selected from substituted or unsubstituted $C_1$-$C_4$OH, substituted or unsubstituted arylOH, substituted or unsubstituted $C_1$-$C_4$COR$_4$, substituted or unsubstituted arylCOR$_4$, substituted or unsubstituted $C_1$-$C_4$OCOCH=$CH_2$, substituted or unsubstituted arylOCOCH=$CH_2$, substituted or unsubstituted $C_1$-$C_4$OCOC($CH_3$)=$CH_2$, substituted or unsubstituted arylOCOC($CH_3$)=$CH_2$, substituted or unsubstituted $C_1$-$C_4$NHCOCH=$CH_2$, or substituted or unsubstituted arylNHCOCH=$CH_2$. In specific embodiments, $R_1$ may be selected from a group consisting of —$CH_2CH_2$OCOCH=$CH_2$, —$CH_2CH_2$OCOC($CH_3$)=$CH_2$, —$CH_2CH_2$NHCOCH=$CH_2$.

In accordance with embodiments of the Reaction Scheme depicted in FIG. 3, $R_2$ is selected from a group consisting of hydrogen, substituted or unsubstituted $C_1$-$C_{10}$OH, substituted or unsubstituted arylOH, substituted or unsubstituted $C_1$-$C_{10}$OCOC($CH_3$)=$CH_2$, or substituted or unsubstituted arylOCOC($CH_3$)=$CH_2$. In some embodiments, $R_2$ is selected from a group consisting of hydrogen, substituted or unsubstituted $C_1$-$C_6$OH, substituted or unsubstituted arylOH, substituted or unsubstituted $C_1$-$C_6$OCOC($CH_3$)=$CH_2$, or substituted or unsubstituted arylOCOC($CH_3$)=$CH_2$. In certain embodiments, $R_2$ is selected from a group consisting of hydrogen, substituted or unsubstituted $C_1$-$C_4$OH, substituted or unsubstituted arylOH, substituted or unsubstituted $C_1$-$C_4$OCOC($CH_3$)=$CH_2$, or substituted or unsubstituted arylOCOC($CH_3$)=$CH_2$. In specific embodiments, $R_2$ may be selected from a group consisting of —$CH_2CH_2$OH, —$CH_2CH_2$OCOCH=$CH_2$, —$CH_2CH_2$OCOC($CH_3$)=$CH_2$, —$CH_2CH_2$NHCOCH=$CH_2$.

In accordance with embodiments of the Reaction Scheme depicted in FIG. 3, $R_3$ is CHR$_8$ or O. In certain embodiments, $R_3$ is —$CH_2$— or O. In specific embodiments, $R_3$ is —$CH_2$—.

In accordance with embodiments of the Reaction Scheme depicted in FIG. 3, $R_4$, $R_5$, and $R_6$ are independently selected from a group consisting of H, $C_1$-$C_8$ substituted or unsubstituted alkyl, or substituted or unsubstituted aryl. In some embodiments, $R_4$, $R_5$, and $R_6$ may be independently selected from a group consisting of H, $C_1$-$C_4$ substituted or unsubstituted alkyl, or substituted or unsubstituted aryl. In certain embodiments, $R_4$, $R_5$, and $R_6$ may be independently selected from a group consisting of $C_1$-$C_4$ substituted or unsubstituted alkyl, or substituted or unsubstituted aryl. In specific embodiments, $R_4$, $R_5$, and $R_6$ is selected from a group consisting of methyl, tert-butyl, or phenyl.

In accordance with embodiments of the Reaction Scheme depicted in FIG. 3, $R_7$ is selected from a group consisting of hydrogen, or substituted or unsubstituted $C_1$-$C_{10}$ alkyl. In various embodiments, $R_7$ may be selected from a group consisting of hydrogen, or substituted or unsubstituted $C_1$-$C_8$ alkyl. In specific embodiments, $R_7$ may be selected from a group consisting of hydrogen, methyl, or ethyl.

In accordance with further embodiments of the Reaction Scheme depicted in FIG. 3, X is CN, COOR$_8$ or CONR$_9$R$_{10}$; and R$_8$, R$_9$, and R$_{10}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl. In some embodiments, X may be CN, COOR$_8$ or CONR$_9$R$_{10}$; and R$_8$, R$_9$, and R$_{10}$ may be independently selected from a group consisting of H, $C_1$-$C_6$ substituted or unsubstituted alkyl optionally substituted with at least one heteroatom on the alkyl chain, substituted or unsubstituted aryl, or substituted or unsubstituted heteroaryl. In certain embodiments, X may be CN, COOR$_8$ or CONR$_9$R$_{10}$; and R$_8$, R$_9$, and R$_{10}$ may be independently selected from a group consisting of H, $C_1$-$C_4$ substituted or unsubstituted alkyl optionally substituted with at least one heteroatom on the alkyl chain, substituted or unsubstituted aryl, or substituted or unsubstituted heteroaryl. In specific embodiments, X is COOR$_8$; and R$_8$ is selected from a group consisting of hydrogen, methyl, ethyl, 2-methoxymethyl, n-butyl, iso-butyl, or 2-ethylhexyl.

In accordance with further embodiments of the Reaction Scheme depicted in FIG. 3, $R_{11}$ and $R_{12}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl. In some embodiments, $R_{11}$ and $R_{12}$ are independently selected from a group consisting of H, $C_1$-$C_6$ substituted or unsubstituted alkyl optionally substituted with at least one heteroatom on the alkyl chain, substituted or unsubstituted aryl, or substituted or unsubstituted heteroaryl. In certain embodiments, $R_{11}$ and $R_{12}$ are independently selected from a group consisting of H, $C_1$-$C_4$ substituted or unsubstituted alkyl optionally substituted with at least one heteroatom on the alkyl chain, substituted or unsubstituted aryl, or substituted or unsubstituted heteroaryl. In specific embodiments, $R_{11}$ and $R_{12}$ are H.

In accordance with embodiments of the Reaction Scheme depicted in FIG. 3, $R_1$ is selected from a group consisting of substituted or unsubstituted $C_1$-$C_{10}$OH, substituted or unsubstituted arylOH, substituted or unsubstituted $C_1$-$C_{10}$COR$_7$, substituted or unsubstituted arylCOR$_7$, substituted or unsubstituted $C_1$-$C_{10}$OCOCH=$CH_2$, substituted or unsubstituted arylOCOCH=$CH_2$, substituted or unsubstituted $C_1$-$C_{10}$OCOC($CH_3$)=$CH_2$, substituted or unsubstituted arylOCOC($CH_3$)=$CH_2$, substituted or unsubstituted $C_1$-$C_{10}$NHCOCH=$CH_2$, or substituted or unsubstituted arylNHCOCH=$CH_2$; $R_2$ is selected from a group consisting of hydrogen, substituted or unsubstituted $C_1$-$C_{10}$OH, substituted or unsubstituted arylOH, substituted or unsubstituted $C_1$-$C_{10}$OCOC(CH3)=$CH_2$, or substituted or unsubstituted arylOCOC($CH_3$)=$CH_2$; $R_3$ is CHR$_8$ or O; $R_4$, $R_5$, and $R_6$ are independently selected from a group consisting of H, $C_1$-$C_8$ substituted or unsubstituted alkyl, or substituted or unsubstituted aryl; $R_7$ is selected from a group consisting of hydrogen, or substituted or unsubstituted $C_1$-$C_{10}$ alkyl; X is CN, COOR$_8$ or CONR$_9$R$_{10}$; R$_8$, R$_9$, and R$_{10}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl; and $R_{11}$ and $R_{12}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl.

(a) Initiation Reaction of Step (a)

Step (a) involves contacting the initiating compound comprising Formula (VI) with a silane in the presence of a catalyst to form the compound comprising Formula (VII). Contacting between the compound comprising Formula (VI) and the silane in the presence of the catalyst entails hydrosilylation of the terminal functional group in $R_1$.

The initiating compound comprising Formula (VI) is detailed herein and above. In some embodiments, $R_1$ may be selected from substituted or unsubstituted $C_1$-$C_6$OH, substituted or unsubstituted arylOH, substituted or unsubstituted $C_1$-$C_6$COR$_7$, substituted or unsubstituted arylCOR$_7$, substituted or unsubstituted $C_1$-$C_6$OCOCH=CH$_2$, substituted or unsubstituted arylOCOCH=CH$_2$, substituted or unsubstituted $C_1$-$C_6$OCOC(CH$_3$)=CH$_2$, substituted or unsubstituted arylOCOC(CH$_3$)=CH$_2$, substituted or unsubstituted $C_1$-$C_6$NHCOCH=CH$_2$, or substituted or unsubstituted arylNHCOCH=CH$_2$, $R_2$ is selected from a group consisting of hydrogen, substituted or unsubstituted $C_1$-$C_6$OH, substituted or unsubstituted arylOH, substituted or unsubstituted $C_1$-$C_6$OCOC(CH$_3$)=CH$_2$, or substituted or unsubstituted arylOCOC(CH$_3$)=CH$_2$; and $R_3$ is either —CH$_2$— or O. In other embodiments, $R_1$ may be selected from substituted or unsubstituted $C_1$-$C_4$OH, substituted or unsubstituted arylOH, substituted or unsubstituted $C_1$-$C_4$COR$_4$, substituted or unsubstituted arylCOR$_4$, substituted or unsubstituted $C_1$-$C_4$OCOCH=CH$_2$, substituted or unsubstituted arylOCOCH=CH$_2$, substituted or unsubstituted $C_1$-$C_4$OCOC(CH$_3$)=CH$_2$, substituted or unsubstituted arylOCOC(CH$_3$)=CH$_2$, substituted or unsubstituted $C_1$-$C_4$NHCOCH=CH$_2$, or substituted or unsubstituted arylNHCOCH=CH$_2$; $R_2$ is selected from a group consisting of hydrogen, substituted or unsubstituted $C_1$-$C_4$OH, substituted or unsubstituted arylOH, substituted or unsubstituted $C_1$-$C_4$OCOC(CH$_3$)=CH$_2$, or substituted or unsubstituted arylOCOC(CH$_3$)=CH$_2$; and $R_3$ is either —CH$_2$ or O. In preferred embodiments, $R_1$ is selected from a group consisting of —CH$_2$CH$_2$OCOCH=CH$_2$, —CH$_2$CH$_2$OCOC(CH$_3$)=CH$_2$, —CH$_2$CH$_2$NHCOCH=CH$_2$; $R_2$ may be selected from a group consisting of —CH$_2$CH$_2$OH, —CH$_2$CH$_2$OCOCH=CH$_2$, —CH$_2$CH$_2$OCOC(CH$_3$)=CH$_2$, —CH$_2$CH$_2$NHCOCH=CH$_2$; and $R_3$ is —CH$_2$—.

Numerous silanes are useful in the above described process. Various silanes are described above. The silane in the presence of the catalyst introduces a silyl group on the nucleophilic of the compound comprising Formula (VI) in a hydrosilylation reaction. Non-limiting examples of suitable silanes may be trimethylsilane, dimethylethylsilane, dimethyl(isopropyl)silane, diethylmethyl silane, dimethylpropylsilane, triisopropylsilane, t-butyldimethylsilane, dimethylpentylsilane, bis(t-butyl)methylsilane, dimethylphenylsilane, diethylphenylsilane, or methylbutylphenylsilane.

In general, the mole ratio of the silane to the compound comprising Formula (VI) may range from about 0.95:1.0 to about 1.5:1.0. In various embodiments, the mole ratio of the silane to the compound comprising Formula (I) may range from about 1.0:1.0 to about 1.5:1.0, from about 1.1:1.0 to about 1.4:1.0, or from about 1:2:1.0 to about 1.05:1.0. In a preferred embodiment, mole ratio of the silane to the compound comprising Formula (I) may be about 1.03:1.0.

In various embodiments, the catalyst useful in step (a) of the process may be a Lewis acid catalyst. A wide variety of Lewis acid catalysts may be used in the process. Non-limiting examples of suitable Lewis acid catalysts may be boron trichloride, boron trifluoride etherate, trimethylsilyltriflate, titanium tetrachloride, aluminum chloride, silicon tetrafluoride, tris(pentafluorophenyl)boron, aluminum isopropoxide, tin tetrachloride, boron trichloride, or trimethylsilylNTf$_2$. In one preferred embodiment, the catalyst useful in step (a) is tris(pentafluorophenyl)boron.

In general, the mole ratio of the catalyst to the compound comprising Formula (VI) may range from 0.001:1.0 to about 0.1:1.0. In various embodiments, the mole ratio of the catalyst to the compound comprising Formula (VI) may range from 0.001:1.0 to about 0.1:1.0, from about 0.005:1.0 to about 0.05:1.0, or from about 0.007 to about 0.03:1.0. In one embodiment, the mole ratio of the catalyst to the compound comprising Formula (I) may be about 0.01:1.0.

The reaction mixture, as detailed herein, may also comprise a solvent. The solvent can and will vary depending on the starting substrates, the catalyst, and the silane used in the process. The solvent may be a polar protic solvent, a polar aprotic solvent, a non-polar solvent, or combinations thereof. Suitable examples of polar protic solvents include, but are not limited to, water; alcohols such as methanol, ethanol, isopropanol, n-propanol, isobutanol, n-butanol, s-butanol, t-butanol, and the like; diols such as propylene glycol; organic acids such as formic acid, acetic acid, and so forth; amines such as trimethylamine, or triethylamine, and the like; amides such as formamide, acetamide, and so forth; and combinations of any of the above. Non-limiting examples of suitable polar aprotic solvents include acetonitrile, dichloromethane (DCM), diethoxymethane, N,N-dimethyl acetamide (DMAC), N,N-dimethylformamide (DMF), dimethylsulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, 1,4-dioxane, N-methyl-2-pyrrolidinone (NMP), ethyl formate, formamide, hexamethylphosphoramide, N-methylacetamide, N-methylformamide, methylene chloride, nitrobenzene, nitromethane, propionitrile, sulfolane, tetramethylurea, tetrahydrofuran (THF), 2-methyltetrahydrofuran, trichloromethane, and combinations thereof. Suitable examples of non-polar solvents include, but are not limited to, alkane and substituted alkane solvents (including cycloalkanes), aromatic hydrocarbons, esters, ethers, combinations thereof, and the like. Specific non-polar solvents that may be employed include, for example, benzene, butyl acetate, t-butyl methylether, chlorobenzene, chloroform, chloromethane, cyclohexane, dichloromethane, dichloroethane, diethyl ether, ethyl acetate, diethylene glycol, fluorobenzene, heptane, hexane, isopropyl acetate, methyltetrahydrofuran, pentyl acetate, n-propyl acetate, tetrahydrofuran, toluene, and combinations thereof. In one exemplary embodiment, the solvent may be a combination of polar solvents. In one preferred embodiment, the solvent used in the process may be dichloromethane.

In general, the volume to weight ratio of the solvent to the compound comprising Formula (VI) will range from about 0.5:1 to about 100:1. In various embodiments, the volume to weight ratio of the solvent to the compound comprising Formula (I) may range from about 0.5:1 to about 100:1, from about 2:1 to about 80:1, from about 5:1 to about 50:1, or from about 10:1 to about 40:1. In an exemplary embodiment, the volume to weight ratio of the solvent to the compound comprising Formula (I) may range from about 3:1 to about 20:1.

In general, the reaction of step (a) will be conducted at a temperature that ranges from about −10° C. to about 80° C. In various embodiments, the temperature of the reaction may range from about −10° C. to about 0° C., 0° C. to about 10° C., 10° C. to about 20° C., from about 20° C. to about 30° C., from about 30° C. to about 40° C., from about 40° C. to about 60° C., or from about 60° C. to about 80° C. In one embodiment, the reaction may be conducted at temperature that ranges from about 10° C. to about 40° C., or from about 20° C. to about 30° C. In another embodiment, the temperature of the reaction may be about room temperature (~23° C.). The reaction typically is performed under ambient pressure. The reaction may also be conducted under an inert atmosphere, for example under nitrogen, argon or helium.

Generally, the reaction is allowed to proceed for a sufficient period of time until the reaction is complete, as determined by any method known to one skilled in the art, such as proton nuclear magnetic resonance (e.g., $^1$H NMR). The duration of the reaction may range from about 5 minutes to about 24 hours. In some embodiments, the duration of the reaction may range from about 5 minutes to about 30 minutes, from about 30 minutes to about 2 hours, from about 2 hours to about 4 hours, from about 4 hours to about 10 hours, from about 10 hours to about 15 hours, or from about 15 hours to about 24 hours. In an exemplary embodiment, the reaction may be allowed to proceed for about 0.5 hour to about 2 hours. In this context, a "completed reaction" generally means that the reaction mixture contains a significantly diminished amount of the compound of Formula (VI). Typically, the amount of the compound of Formula (I) remaining in the reaction mixture at the end of the reaction may be less than about 10%, less than about 5%, or less than about 2%.

The compound comprising Formula (VII) may have a yield of at least about 50%. In various embodiments, the compound comprising Formula (VII) may have a yield of at least about 50%, at least about 60%, at least about 65%, at least about 70%, at least about 75%, at least about 80%, at least about 85%, at least about 90%, at least about 95%, or at least about 99%.

Generally, the reaction mixture after step (a) may be worked-up in a variety of methods. In some embodiments, the reaction mixture directly from step (a) may be used directly without purification in step (b). In other embodiments, the reaction mixture may be evaporated under reduced pressure to remove volatile impurities. In yet other embodiments, the reaction mixture may be distilled (at atmospheric pressure or under reduced pressure) to not only remove impurities but also distill the compound comprising Formula (VII). In all cases, as appreciated from the skilled artisan, contacting the reaction mixture comprising the compound comprising Formula (VII) with an aqueous solution will cleave the silyl group on $R_1$ and revert back to the compound of Formula (VI).

Generally, the reaction mixture after step (a) may be worked-up in a variety of methods. In some embodiments, the reaction mixture directly from step (a) may be used directly without purification in step (b). In other embodiments, the reaction mixture may be evaporated under reduced pressure to remove volatile impurities. In yet other embodiments, the reaction mixture may be distilled (at atmospheric pressure or under reduced pressure) to not only remove impurities but also distill the compound comprising Formula (VII). In all cases, as appreciated from the skilled artisan, contacting the reaction mixture comprising the compound comprising Formula (VII) with an aqueous solution will cleave the silyl group on $R_1$ and revert back to the compound of Formula (VI).

(b) Group Transfer Polymerization of Step (b)

The second step of the process, step (b), comprises contacting the compound comprising Formula (VII) with a monomer comprising Formula (III) using a group transfer polymerization (GTP) to prepare the compound comprising Formula (VIII).

The compound comprising Formula (VII) is described herein and above.

The compound comprising Formula (III) is described above. In some embodiment, $R_7$ may be may be selected from a group consisting of hydrogen, or substituted or unsubstituted $C_1$-$C_8$ alkyl; and $R_{11}$ and $R_{12}$ are independently selected from a group consisting of H, $C_1$-$C_6$ substituted or unsubstituted alkyl optionally substituted with at least one heteroatom on the alkyl chain, substituted or unsubstituted aryl, or substituted or unsubstituted heteroaryl. In specific embodiments, $R_7$ may be selected from a group consisting of hydrogen, methyl, 2-methoxymethyl, n-butyl, iso-butyl, or 2-ethylhexyl; and $R_{11}$ and $R_{12}$ are hydrogen. In some embodiments, X may be CN, $COOR_8$ or $CONR_9R_{10}$; and $R_8$, $R_9$, and $R_{10}$ may be independently selected from a group consisting of H, $C_1$-$C_6$ substituted or unsubstituted alkyl, or substituted or unsubstituted aryl. In certain embodiments, X may be CN, $COOR_8$ or $CONR_9R_{10}$; and $R_8$, $R_9$, and $R_{10}$ may be independently selected from a group consisting of H, $C_1$-$C_4$ substituted or unsubstituted alkyl, or substituted or unsubstituted aryl. In specific embodiments, X is $COOR_8$; and $R_8$ is selected from a group consisting of hydrogen, methyl, or ethyl. Non-limiting examples of compounds comprising Formula (III) may be n-butyl acrylate, 2-methoxyethyl acrylate, methylmethacrylate, 2-ethylhexyl methacrylate, and isobutyl acrylate.

Generally, the mole ratio of the monomer comprising Formula (III) with the compound comprising Formula (VI) may range from about 10.0:1.0 to 100.0:1.0. In various embodiments, the mole ratio of the monomer comprising Formula (III) with the compound comprising Formula (VI) may range from about 10.0:1.0 to 100.0:1.0, from about 20.0:1.0 to about 80.0:1.0, from about 30.0:1.0 to about 70.0:1.0, or from about 40.0:1.0 to about 60.0:1.0.

The group transfer polymerization may take place in the presence of catalyst. The catalyst of the group transfer polymerization of step (b) may be the same or different than used in the initiation reaction of step (a). The catalyst may be carried over from step (a), such that additional catalyst may not need to be added to the reaction mixture. In one embodiment, the catalyst is a Lewis Acid catalyst. The catalyst in step (b) may be the same or different than step (a). In particular embodiments, e.g., when Formula III comprises a methacrylate monomer, it may be preferred to utilize a different Lewis Acid catalyst in step (b) as compared to step (a). A wide variety of Lewis acid catalysts may be used in the process. Non-limiting examples of suitable Lewis acid catalysts may be boron trichloride, boron trifluoride etherate, trimethylsilyltriflate, titanium tetrachloride, aluminum chloride, silicon tetrafluoride, tris(pentafluorophenyl)boron, aluminum isopropoxide, tin tetrachloride, boron trichloride, or trimethylsilylNTf$_2$. In one preferred embodiment, the catalyst useful in step (a) is TMSNTf$_2$.

Depending on how the reaction mixture from step (a) is worked up, the reaction mixture, as detailed herein, may further comprise an optional solvent. Appropriate solvents are detailed herein and above.

In general, if a solvent is needed, the volume to weight ratio of the solvent to the compound comprising Formula (I) will range from about 0.5:1 to about 50:1. In various embodiments, the volume to weight ratio of the solvent to the compound comprising Formula (I) may range from about 0.5:1 to about 2:1, from about 2:1 to about 5:1, from about 5:1 to about 25:1, or from about 25:1 to about 50:1. In an exemplary embodiment, the volume to weight ratio of the solvent to the compound comprising Formula (I) may range from about 5:1 to about 20:1.

In general, the reaction of step (b) will be conducted at a temperature that ranges from about −10° C. to about 80° C. In various embodiments, the temperature of the reaction may range from about −10° C. to about 0° C., 0° C. to about 10° C., 10° C. to about 20° C., from about 20° C. to about 30° C., from about 30° C. to about 40° C., from about 40° C. to about 60° C., or from about 60° C. to about 80° C. In one embodiment, the reaction may be conducted at temperature that ranges from about 10° C. to about 40° C., or from about 20° C. to about 30° C. In another embodiment, the temperature of the reaction may be about room temperature (~23° C.). The reaction typically is performed under ambient pressure. The reaction may also be conducted under an inert atmosphere, for example under nitrogen, argon, or helium.

Generally, the reaction is allowed to proceed for a sufficient period of time until the reaction is complete, as determined by any method known to one skilled in the art, such as NMR (e.g., $^1$H NMR). The duration of the reaction may range from about 5 minutes to about 24 hours. In some embodiments, the duration of the reaction may range from about 5 minutes to about 30 minutes, from about 30 minutes to about 2 hours, from about 2 hours to about 4 hours, from about 4 hours to about 10 hours, from about 10 hours to about 15 hours, or from about 15 hours to about 24 hours. In an exemplary embodiment, the reaction may be allowed to proceed for about 2 hours. In this context, a "completed reaction" generally means that the reaction mixture contains a significantly diminished amount of the compound of Formula (VII). Typically, the amount of the compound of Formula (VII) remaining in the reaction mixture at the end of the reaction may be less than about 10%, less than about 5%, or less than about 2%.

Generally, the reaction mixture after step (b) may be worked-up in a variety of methods known in the art, for example, chromatography or running the reaction mixture through a plug of silica, alumina, or combinations thereof.

The compound comprising Formula (VIII) or after conducting steps (a) and (b) may have a yield of at least about 60%. In various embodiments, the compound comprising Formula (VIII) may have a yield of at least about 60%, at least about 65%, at least about 70%, at least about 75%, at least about 80%, at least about 85%, at least about 90%, at least about 95%, or at least about 99%.

(c) Ring Opening Metathesis Polymerization of Step (c)

Step (c) of the process comprises contacting the compound comprising Formula (VIII) using a catalyst to form a compound comprising Formula (IX). As appreciated by the skilled artisan, this process step may be termed a "ring opening metathesis polymerization" or ROMP.

The compound comprising Formula (VIII) is described in more detail above.

A wide variety of catalysts may be used. In one aspect, the catalyst may be either homogeneous or heterogeneous. Generally, these catalysts affect a ring opening metathesis polymerization reaction. In various embodiments, the catalyst comprises a ruthenium or molybdenum catalyst. As appreciated by the skilled artisan, the catalyst are referred as ruthenium(II) carbenoid complexes or third generation "Grubbs" catalyst (G3). Other catalysts which affect this conversion are known as "Schrock" catalyst which are molybdenum(VI)- and tungsten(VI)-based centers supported by alkoxide and imido ligands or "Boyston Photocatalyst" which are iridium, pyrylium, or thiopyryium based catalysts.

In general, the mole ratio of the catalyst to the compound comprising formula (VIII) may range from 0.001:1.0 to about 0.1:1.0. In various embodiments, the mole ratio of the catalyst to the compound comprising formula (VIII) may range from 0.001:1.0 to about 0.1:1.0, from about 0.005:1.0 to about 0.05:1.0, or from about 0.007 to about 0.03:1.0. In one embodiment, the mole ratio of the catalyst to the compound comprising Formula (IV) may be about 0.01:1.0.

A list of suitable optional solvents is described herein and above. In one preferred embodiment, the optional solvent in step (c) is dichloromethane.

In general, the reaction of step (c) will be conducted at a temperature that ranges from about −10° C. to about 80° C. In various embodiments, the temperature of the reaction may range from about −10° C. to about 0° C., 0° C. to about 10° C., 10° C. to about 20° C., from about 20° C. to about 30° C., from about 30° C. to about 40° C., from about 40° C. to about 60° C., or from about 60° C. to about 80° C. In one embodiment, the reaction may be conducted at temperature that ranges from about 10° C. to about 40° C., or from about 20° C. to about 30° C. In another embodiment, the temperature of the reaction may be about room temperature (~23° C.). The reaction typically is performed under ambient pressure. The reaction may also be conducted under an inert atmosphere, for example under nitrogen, argon or helium.

Generally, the reaction is allowed to proceed for a sufficient period of time until the reaction is complete, as determined by any method known to one skilled in the art, such as gel permeation chromatography (e.g., GPC) or NMR (e.g., $^1$H NMR). The duration of the reaction may range from about 5 minutes to about 24 hours. In some embodiments, the duration of the reaction may range from about 5 minutes to about 30 minutes, from about 30 minutes to about 2 hours, from about 2 hours to about 4 hours, from about 4 hours to about 10 hours, from about 10 hours to about 15 hours, or from about 15 hours to about 24 hours. In an exemplary embodiment, the reaction may be allowed to proceed for about 2 hours. In this context, a "completed reaction" generally means that the reaction mixture contains a significantly diminished amount of the compound of Formula (VIII). Typically, the amount of the compound of Formula (VIII) remaining in the reaction mixture at the end of the reaction may be less than about 10%, less than about 5%, or less than about 2%.

Generally, the reaction mixture after step (c) may be worked-up in a variety of methods known in the art, e.g., by quenching the catalyst and precipitation of the brush polymer.

The compound comprising Formula (IX) or the brush polymer has a controlled molecular weight due to the stoichiometry of the monomer comprising Formula (III) to the catalyst in step (c).

In general, the average molecular weight observed (Mn obs) of the compounds comprising Formula (IX) may range from 0.5 to 10.0 kDa. In various embodiments, the average molecular weight observed (Mn obs) of the compounds comprising Formula (V) may range from 0.5 to 10.0 kDa, from about 2.0 to about 6.0, or from about 3.0 to about 5.0.

Generally, the weight average molecular weight divided by the number average molecular weight observed may range from about 1.00 to about 1.30. In various embodiments, the weight average molecular weight divided by the number average molecular weight observed may range from about 1.00 to about 1.30, from about 1.00 to about 1.20, or from 1.00 to about 1.09.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

The term "acyl," as used herein alone or as part of another group, denotes the moiety formed by removal of the hydroxyl group from the group COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "alkyl" as used herein describes saturated hydrocarbyl groups that contain from 1 to 30 carbon atoms. They may be linear, branched, or cyclic, may be substituted as defined below, and include methyl, ethyl, propyl, isopropyl, butyl, hexyl, heptyl, octyl, nonyl, and the like.

The term "alkenyl" as used herein describes hydrocarbyl groups which contain at least one carbon-carbon double bond and contain from 1 to 30 carbon atoms. They may be linear, branched, or cyclic, may be substituted as defined below, and include ethenyl, propenyl, isopropenyl, butenyl, isobutenyl, hexenyl, and the like.

The term "alkoxide" or "alkoxy" as used herein is the conjugate base of an alcohol. The alcohol may be straight chain, branched, cyclic, and includes aryloxy compounds.

The term "alkynyl" as used herein describes hydrocarbyl groups which contain at least one carbon-carbon triple bond and contain from 1 to 30 carbon atoms. They may be linear or branched, may be substituted as defined below, and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The term "aryl" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl.

The terms "halogen" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. They may be straight, branched, or cyclic. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

Having described the invention in detail, it will be apparent that modifications and variations are possible without departing from the scope of the invention defined in the appended claims.

EXAMPLES

The following examples illustrate various embodiments of the invention.

Example 1: Preparation of Brush Polymers

The preparation of the brush polymers was conducted using the following scheme:

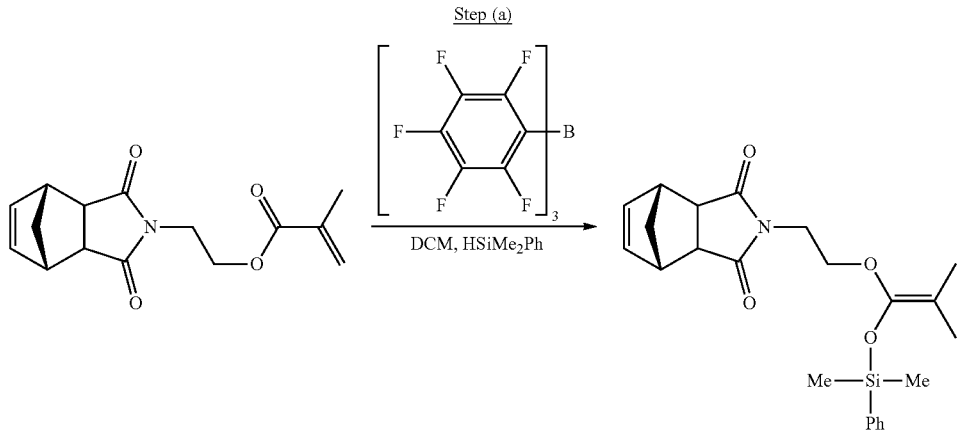

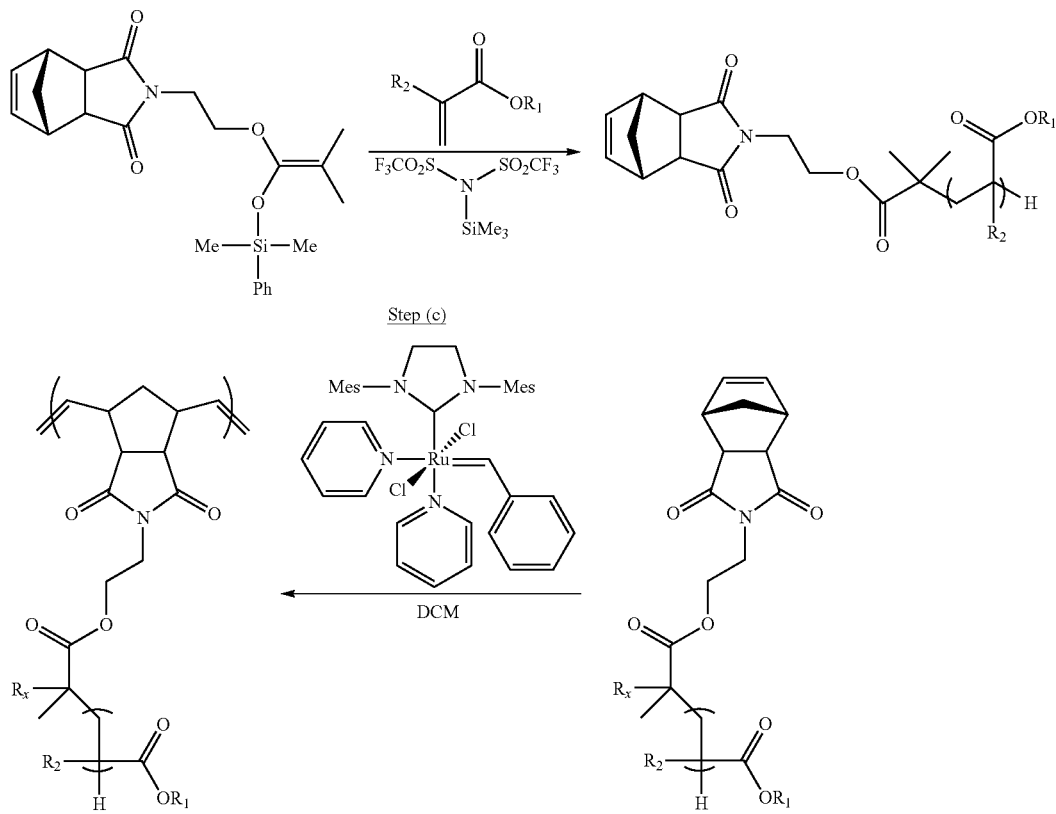

$R_2$=H or $CH_3$; $R_x$=H (norbornene-acrylate initiator) or $CH_3$ (norbornene-methacrylate initiator)

Exemplary synthetic methodology of the above Reaction Scheme is presented below. However, the disclosure is not so limited and this method is not limited to this initiating species or synthons.

Synthesis of Norbornene Initiating Group

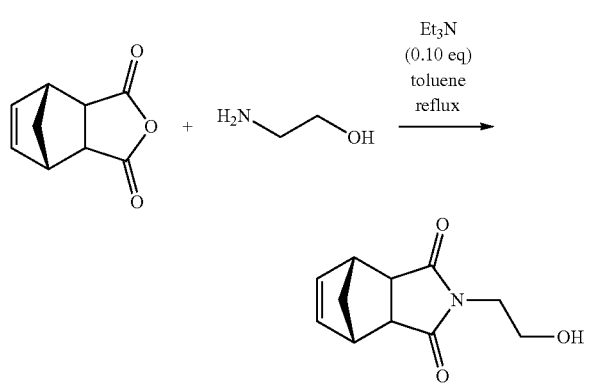

Synthesis of cis-5-norbornene-exo-2,3-dicarboxylic anhydride: This compound was synthesized using an adapted procedure previously reported. A 1 L round bottom flask was half filled (~425 g) with a mixture of norbornene exo- and endo-anhydride. The flask was then fitted with a reflux condenser, and heated neat at 180° C. for at least 16 hours. The resulting molten yellow/red solid was slowly cooled to 130° C. wherein toluene (~400 mL) was added. If solids were present, the resulting mixture was heated to reflux and recrystallized at room temperature. During the first recrystallization, after the norbornene anhydride is fully dissolved in the hot toluene, the solution is immediately passed through a layered 100 g plug of 50/50 basic alumina/silica gel which completely removes the yellow/red color. The resulting clear solution rapidly yielded white crystals as the solution cooled. These solids were collected and recrystallized after dissolving in refluxing toluene and allowing it to cool an additional three times. Filtering through the plug can be repeated as necessary throughout the toluene recrystallizations to remove any remaining color. After 3 recrystallizations, white crystals were recovered (93.8 g, 22% recovery), with an exo-anhydride purity of 97%.

Synthesis of N-(ethylmethacrylate)-cis-5-norbornene-exo-2,3-dicarboximide

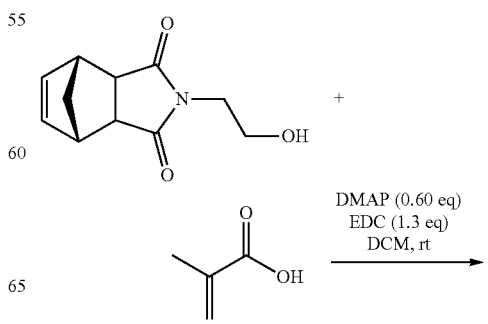

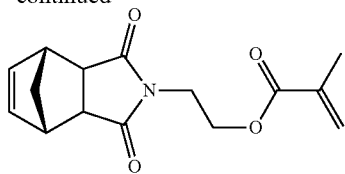

To a 1 L Schlenk flask which was flame dried and backfilled with nitrogen 3 times was added N-(Hydroxyethyl)-cis-5-norbornene-exo-2,3-dicarboximide (83.4 g), 4-(dimethylamino)pyridine (29.5 g), methacrylic acid (44 mL), and 650 mL of anhydrous DCM. The heterogenous solution was allowed to mix for 20 minutes over an ice bath, then 1-ethyl-3-(d-dimethylaminopropyl)carbodiimide (93.8 g) was added slowly. The reaction was allowed to proceed for two days after which the organic layer was washed with 0.5M HCl, a saturated NaHCO$_3$ solution, water, brine, and then dried over MgSO$_4$. The organic layer was then concentrated in the dark, as the compound is light sensitive, to give a white solid (46 g, 41.5% yield). $^1$H NMR (400 MHz, CDCl$_3$) δ6.20 (s, 2H), 5.94 (s, 1H), 5.46 (s, 1H), 4.19 (t, 2H), 3.71 (t, 2H), 3.16 (s, 2H), 2.61 (s, 2H), 1.79 (s, 3H), 1.39 (d, 1H), 1.19 (d, 1H). $^{13}$C NMR (100 MHz, CDCl$_3$) 177.3, 166.5, 137.5, 135.5, 125.7, 60.9, 47.5, 44.9, 42.3, 37.2, 17.8.

General Procedure for Synthesis of Monomers via GTP

General Procedure for the Synthesis of Acrylate Monomers

A 250 mL Erlynmeyer flask with a 24/40 adapter and stir bar was dried in an oven at 110° C. overnight and loaded into the glovebox hot. In the glovebox was added 75 mL of anhydrous DCM. To this was added degassed dimethylphenylsilane (573 μL) followed by once sublimed trispentafluorophenylborane (18.6 mg.) After this solution was allowed to stir for 1 minute, a solution of N-(ethylmethacrylate)-cis-5-norbornene-exo-2,3-dicarboximide (1.00 g) in a 0.5M solution in DCM. This solution was allowed to stir for an additional 10 minutes wherein the acrylate was syringed into the stirring solution and allowed to react for 2 hours. After quantitative conversion of the monomer is seen by NMR, 1 mL of methanol is added to the stirring solution. The reaction is then passed through a pad of silica and used in ROMP without further purification.

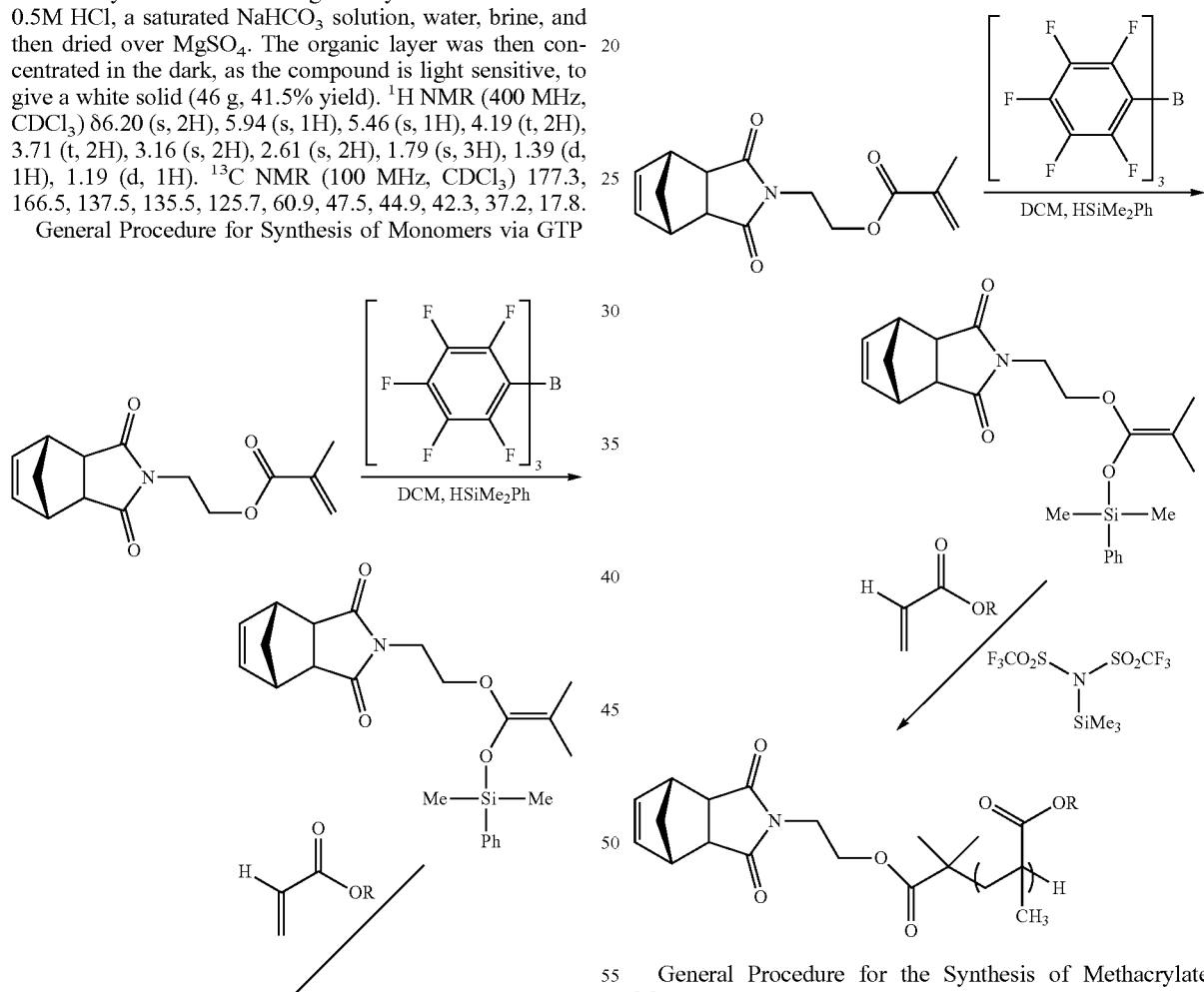

General Procedure for the Synthesis of Methacrylate Monomers

A 250 mL Erlynmeyer flask with a 24/40 adapter and stir bar was dried in an oven and loaded into the glovebox antechamber to cool under active vacuum. In the glovebox was added 75 mL of anhydrous DCM. To this was added degassed dimethylphenylsilane (573 μL) followed by once sublimed trispentafluorophenylborane (18.6 mg) After this solution was allowed to stir for 1 minute, a solution of N-(ethylmethacrylate)-cis-5-norbornene-exo-2,3-dicarboximide (1.00 g) in a 0.5M solution in DCM. This solution was allowed to stir for an additional 10 minutes wherein the methacrylate was syringed into the stirring solution. Lastly, N-(Trimethylsiyl) bis (trifluoromethanesulfonyl) imide (51 µL) was added and the reaction was allowed to run for 4 hours. After quantitative conversion of the monomer is seen by NMR, 1 mL of methanol is added to the stirring solution. The reaction is then passed through a pad of silica and used in ROMP without further purification.

General Procedure for Synthesis of Brush Polymers via ROMP:

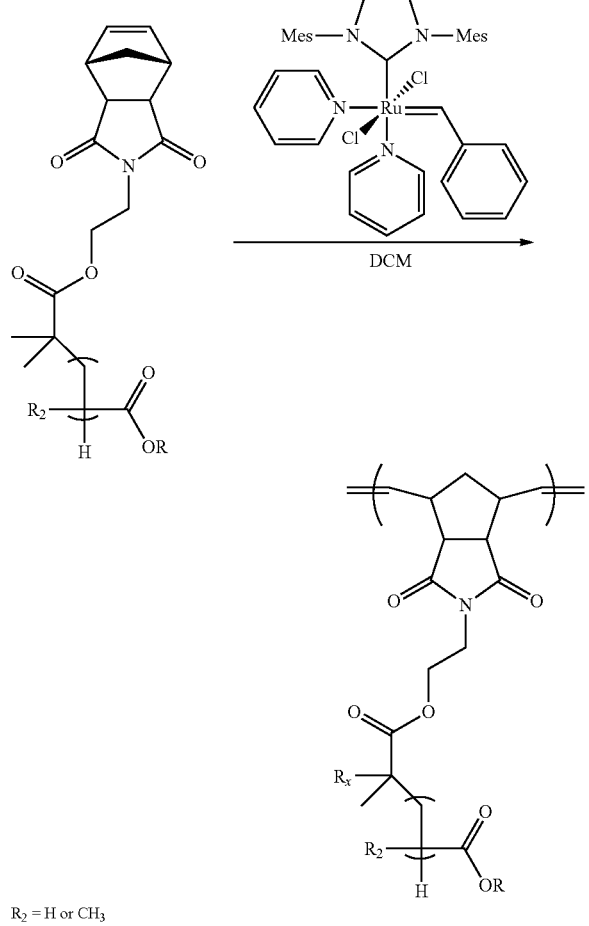

$R_2$ = H or $CH_3$

General Procedure for ROMP of Monomers:

To an oven dried scintillation vial was added monomer and magnetic stir bar, which was brought into a $N_2$ glovebox. Anhydrous DCM solvent was added ($[MM]_0$=0.05 M) and the monomer dissolved. The appropriate amount of a G3 stock solution was added quickly via Hamilton syringe ($[G3]_0$=0.0005 M, target brush polymer DP=100). After 1 hour, the polymerization was quenched with the addition of 0.1 mL of ethyl vinyl ether. The polymer was precipitated into methanol at −78° C., then filtered and dried in a vacuum oven overnight at 50° C.

Exemplary Compounds

Using the above Reaction Schemes and exemplary methodologies, several compounds were synthesized using the methods of the disclosure. Table 1 designates the monomers used in the methods:

TABLE 1

Exemplary Monomers

| Run | Monomer |
| --- | --- |
| 1 | n-Butyl Acrylate |
| 2 | 2-Methoxyethyl Acrylate |
| 3 | Methyl Methacrylate |
| 4 | 2-Ethylhexyl Methacrylate |
| 5 | Isobutyl acrylate |

As Table 2 below demonstrates, a series of monomers were synthesized using the above detailed methodology. The molecular weight of the resulting polymer is controlled via the stoichiometry of the norbornene silyl enol ether relative to monomer loading.

TABLE 2

Results from Group Transfer Polymerization

| Run | Macro Monomer | $M_{n\;calc}$ (kDa) | $M_{n\;obs}$ (kDa)$^a$ | $M_w/M_n^b$ |
| --- | --- | --- | --- | --- |
| 1 | NB-n-Butyl Acrylate | 2.71 | 2.80 | 1.04 |
| 2 | NB-2-MethoxyEthyl Acrylate | 2.75 | 3.20 | 1.05 |
| 3 | NB-Methyl Methacrylate | 2.78 | 2.90 | 1.06 |
| 4 | NB-2-EthylHexyl Methacrylate | 2.85 | 3.75 | 1.09 |
| 5 | NB-Isobutyl Methacrylate | 2.84 | 3.12 | 1.08 |

As Table 3 below demonstrates, a series of brush polymers were synthesized using the above detailed method. The molecular weight of the resulting polymer is controlled via the stoichiometry of the monomer relative to ruthenium catalyst.

TABLE 3

Results from ROMP of Monomers Synthesized by GTP

| Run | Brush Polymer | $M_{n\;calc}$ (kDa) | $M_{n\;obs}$ (kDa)$^a$ | $M_w/M_n^b$ |
| --- | --- | --- | --- | --- |
| 1 | p(NB-n-Butyl Acrylate) | 280.3 | 254.1 | 1.07 |
| 2 | p(NB-2-MethoxyEthyl Acrylate) | 320.0 | 287.5 | 1.08 |
| 3 | p(NB-Methyl Methacrylate) | 290.3 | 242.3 | 1.03 |
| 4 | p(NB-2-EthylHexyl Methacrylate) | 374.9 | 264.5 | 1.06 |
| 5 | p(NB-Isobutyl Methacrylate) | 311.9 | 255.3 | 1.04 |

As various changes could be made in the above-described methods without departing from the scope of the invention, it is intended that all matter contained in the above description and in the examples given below, shall be interpreted as illustrative and not in a limiting sense.

What is claimed is:

1. A method for preparing a compound comprising Formula (V)

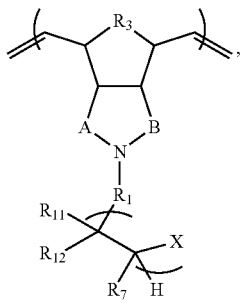

the method comprising:
(a) contacting an initiating compound comprising Formula (I):

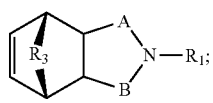

in the presence of a silane and a first catalyst to form a compound comprising Formula (II):

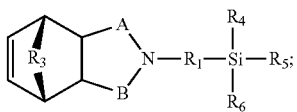

(b) contacting the compound comprising Formula (II) with a monomer comprising Formula (III), optionally in the presence of a second catalyst:

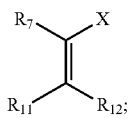

to prepare a compound comprising Formula (IV):

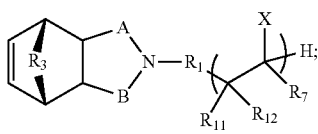

and
(c) contacting the compound comprising Formula (IV) with a ring opening metathesis polymerization (ROMP) catalyst to prepare the compound comprising Formula (V);

wherein
A and B are independently selected from $CH_2$ or C=O;
R is selected from substituted or unsubstituted $C_1$-$C_{10}$OH, substituted or unsubstituted arylOH, substituted or unsubstituted $C_1$-$C_{10}$$COR_7$, substituted or unsubstituted aryl$COR_7$, substituted or unsubstituted $C_1$-$C_{10}$OCOCH=$CH_2$, substituted or unsubstituted arylOCOCH=$CH_2$, substituted or unsubstituted $C_1$-$C_{10}$OCOC($CH_3$)=$CH_2$, substituted or unsubstituted arylOCOC($CH_3$)=$CH_2$, substituted or unsubstituted $C_1$-$C_{10}$NHCOCH=$CH_2$, or substituted or unsubstituted arylNHCOCH=$CH_2$;
$R_1$ is the residue of a group selected from the group consisting of a substituted or unsubstituted $C_1$-$C_{10}$OH, a substituted or unsubstituted arylOH, a substituted or unsubstituted $C_1$-$C_{10}$$COR_7$, a substituted or unsubstituted aryl$COR_7$, a substituted or unsubstituted $C_1$-$C_{10}$OCOCH=$CH_2$, a substituted or unsubstituted arylOCOCH=$CH_2$, a substituted or unsubstituted $C_1$-$C_{10}$OCOC($CH_3$)=$CH_2$, a substituted or unsubstituted arylOCOC($CH_3$)=$CH_2$, a substituted or unsubstituted $C_1$-$C_{10}$NHCOCH=$CH_2$, and a substituted or unsubstituted arylNHCOCH=$CH_2$;
$R_3$ is $CHR_8$ or O;
$R_4$, $R_5$, and $R_6$ are independently selected from a group consisting of H, $C_1$-$C_8$ substituted or unsubstituted alkyl, or substituted or unsubstituted aryl;
$R_7$ is selected from a group consisting of hydrogen, or substituted or unsubstituted $C_1$-$C_{10}$ alkyl; X is CN, $COOR_8$ or $CONR_9R_{10}$;
$R_8$, $R_9$, and $R_{10}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl; and
$R_{11}$ and $R_{12}$ are independently selected from a group consisting of H, $C_1$-$C_{10}$ substituted or unsubstituted alkyl optionally substituted with at least one heteroatom on the alkyl chain, substituted or unsubstituted aryl, or substituted or unsubstituted heteroaryl.

2. The method of claim 1, wherein A and B are independently selected from —$CH_2$-or C=O; $R_1$ is selected from substituted or unsubstituted $C_1$-$C_6$OH, substituted or unsubstituted arylOH, substituted or unsubstituted $C_1$-$C_6$$COR_7$, substituted or unsubstituted aryl$COR_7$, substituted or unsubstituted $C_1$-$C_6$OCOCH=$CH_2$, substituted or unsubstituted arylOCOCH=$CH_2$, substituted or unsubstituted $C_1$-$C_6$OCOC($CH_3$)=$CH_2$, substituted or unsubstituted arylOCOC($CH_3$)=$CH_2$, substituted or unsubstituted $C_1$-$C_6$NHCOCH=$CH_2$, or substituted or unsubstituted arylNHCOCH=$CH_2$; $R_3$ is a $CH_2$ or O; $R_4$, $R_5$, and $R_6$ are independently selected from a group consisting of H, $C_1$-$C_4$ substituted or unsubstituted alkyl, or substituted or unsubstituted aryl; $R_7$ is selected from a group consisting of hydrogen, or substituted or unsubstituted $C_1$-$C_8$ alkyl; X is $COOR_8$ or $CONR_9R_{10}$; $R_8$, $R_9$, and $R_{10}$ are independently selected from a group consisting of H, $C_1$-$C_6$ substituted or unsubstituted alkyl optionally substituted with at least one heteroatom on the alkyl chain, substituted or unsubstituted aryl, or substituted or unsubstituted heteroaryl; and $R_{11}$ and $R_{12}$ are independently selected from a group consisting of H, $C_1$-$C_6$ substituted or unsubstituted alkyl optionally substituted with at least one heteroatom on the alkyl chain, substituted or unsubstituted aryl, or substituted or unsubstituted heteroaryl.

3. The method of claim 1, wherein A and B are independently selected from —$CH_2$-or C=O; $R_1$ is a residue of a group selected from substituted or unsubstituted $C_1$-$C_4$OH, substituted or unsubstituted arylOH, substituted or unsubstituted $C_1$-$C_4COR_4$, substituted or unsubstituted arylCOR$_4$, substituted or unsubstituted $C_1$-$C_4$OCOCH=CH$_2$, substituted or unsubstituted arylOCOCH=CH$_2$, substituted or unsubstituted $C_1$-$C_4$OCOC(CH$_3$)=CH$_2$, substituted or unsubstituted arylOCOC(CH$_3$)=CH$_2$, substituted or unsubstituted $C_1$-$C_4$NHCOCH=CH$_2$, or substituted or unsubstituted arylNHCOCH=CH$_2$; $R_3$ is a CH$_2$ or O; $R_4$, $R_5$, and $R_6$ are independently selected from a group consisting of $C_1$-$C_4$ substituted or unsubstituted alkyl, or substituted or unsubstituted aryl; $R_7$ is selected from a group consisting of hydrogen, or substituted or unsubstituted $C_1$-$C_8$ alkyl; X is COOR$_8$ or CONR$_9$R$_{10}$; and R$_8$, R$_9$, and R$_{10}$ are independently selected from a group consisting of H, $C_1$-$C_4$ substituted or unsubstituted alkyl optionally substituted with at least one heteroatom on the alkyl chain, substituted or unsubstituted aryl, or substituted or unsubstituted heteroaryl; and R$_{11}$ and R$_{12}$ are independently selected from a group consisting of H, $C_1$-$C_4$ substituted or unsubstituted alkyl optionally substituted with at least one heteroatom on the alkyl chain, substituted or unsubstituted aryl, or substituted or unsubstituted heteroaryl.

4. The method of claim 1, wherein A and B are C=O; R$_1$ is selected from a group consisting of CH$_2$CH$_2$OCOCH=CH$_2$, CH$_2$CH$_2$OCOC(CH$_3$)=CH$_2$, —CH$_2$CH$_2$NHCOCH=CH$_2$; R$_3$ is CH$_2$; R$_4$, R$_5$, and R$_6$ is selected from a group consisting of methyl, tert-butyl, or phenyl; R$_7$ is selected from a group consisting of hydrogen, methyl, or ethyl; X is COOR$_8$; R$_8$ is selected from a group consisting of hydrogen, methyl, ethyl, 2-methoxymethyl, n-butyl, iso-butyl, or 2-ethylhexyl; and R$_{11}$ and R$_{12}$ are H.

5. The method of claim 1, wherein the mole ratio of the silane to the compound comprising Formula (I) in step (a) ranges from about 0.95:1.00 to about 1.50:1.00.

6. The method of claim 1, wherein the first catalyst is a Lewis Acid catalyst, and the mole ratio of the first catalyst to the compound comprising Formula (I) in step (a) ranges from about 0.001:1.0 to about 0.1:1.0.

7. The method of claim 1, wherein the reaction temperature of step (a) ranges from about −10° C. to about 80° C.

8. The method of claim 1, wherein in step (b) the monomer comprising Formula (III) is present in an amount such that the mole-to-mole ratio of the monomer comprising Formula (III) present in step (b) to the compound comprising Formula (I) present in step (a) ranges from about 10.0:1.0 to about 100.0:1.0.

9. The method of claim 1, wherein step (b) is performed in the presence of a second catalyst, which is the same or different from the first catalyst, and the second catalyst is present in an amount such that the mole-to-mole ratio of the second catalyst present in step (b) to the compound comprising Formula (I) present in step (a) ranges from about 0.001:1.0 to about 0.1:1.0.

10. The method of claim 1, wherein the reaction temperature of step (b) ranges from about −10° C. to about 80° C.

11. The method of claim 1, wherein the yield of the compound comprising Formula (IV) after steps (a) and (b) is greater than 60%.

12. The method of claim 1, wherein the ring opening metathesis polymerization (ROMP) catalyst comprises a ruthenium catalyst, a molybdenum catalyst, or an iridium catalyst.

13. The method of claim 1, wherein in step (c) the ring opening metathesis polymerization (ROMP) catalyst is present in an amount such that the mole to mole ratio of the ring opening metathesis polymerization (ROMP) catalyst present in step c to the compound comprising Formula (I) present in step (a) ranges from about 0.001 to about 0.1:1.0.

14. The method of claim 1, wherein the reaction temperature of step (c) ranges from about −10° C. to about 80° C.

15. The method of claim 1, wherein the yield of the process from steps (a) to (c) is greater than 60%.

16. The method of claim 1, wherein the number average molecular weight observed (M$_{n\ obs}$) for the compound comprising Formula (V) ranges from about 0.5 to about 10.0 kDa.

17. The method of claim 1, wherein weight average molecular weight divided by the number average molecular weight observed ranges from about 1.0 to about 1.50 for the compound comprising Formula (V).

\* \* \* \* \*

UNITED STATES PATENT AND TRADEMARK OFFICE
CERTIFICATE OF CORRECTION

PATENT NO. : 11,286,340 B2
APPLICATION NO. : 16/775755
DATED : March 29, 2022
INVENTOR(S) : Miyake et al.

It is certified that error appears in the above-identified patent and that said Letters Patent is hereby corrected as shown below:

In the Claims

Claim 2, Column 36, Line 41, after "is" insert --a residue of a group--.

Signed and Sealed this
Eleventh Day of October, 2022

Katherine Kelly Vidal
*Director of the United States Patent and Trademark Office*